United States Patent [19]
Park

[11] Patent Number: 5,921,888
[45] Date of Patent: Jul. 13, 1999

[54] AUTOMATIC TRANSMISSION SYSTEM FOR AUTOMOTIVE VEHICLE

[75] Inventor: Jong Sul Park, Seoul, Rep. of Korea

[73] Assignee: Hyundai Motor Company, Rep. of Korea

[21] Appl. No.: 08/669,430

[22] PCT Filed: May 6, 1995

[86] PCT No.: PCT/KR95/00049

§ 371 Date: Jul. 8, 1996

§ 102(e) Date: Jul. 8, 1996

[87] PCT Pub. No.: WO96/35065

PCT Pub. Date: Nov. 7, 1996

[51] Int. Cl.[6] .................................................. F16H 61/26
[52] U.S. Cl. ......................... 477/131; 477/143; 477/158
[58] Field of Search .................................. 477/127, 130, 477/131, 143, 158, 160

[56] References Cited

U.S. PATENT DOCUMENTS 3,754,482  8/1973  Sanders et al. .
4,776,240  10/1988  Miki .
5,582,559  12/1996  Jang et al. ........................... 477/131 X
5,637,056  6/1997  Park ......................................... 477/131

OTHER PUBLICATIONS

Form PCT/ISA/210 for PCT/KR95/00049.

*Primary Examiner*—Khoi Q. Ta
*Attorney, Agent, or Firm*—Finnegan, Henderson, Farabow, Garrett & Dunner, L.L.P.

[57] ABSTRACT

An automatic transmission for an automotive vehicle which includes a hydraulic pump for pressurizing fluid; a pressure regulating valve for varying hydraulic pressure supplied from the hydraulic pump; seven friction elements for forward driving and two friction elements for reverse driving activated according to spool positions of a manual valve, first and second shift control sections having at least two shift valves for supplying hydraulic pressure to the friction elements selectively, and a torque pressure converting section for supplying torque pressure to the first shift control section.

23 Claims, 24 Drawing Sheets

| RANGES | | 76 | 48 | 58 | 70 | 60 | 34 | 56 | 74 | 68 |
|---|---|---|---|---|---|---|---|---|---|---|
| P | | | | | | | | | | |
| R | | O | | | | | | | O | O |
| N | | | | | | | | | | O |
| D5 | 1 | | | | | | O | | | O |
| D5 | 2 | | O | | | | O | | | O |
| D5 | 3 | | O | | | | O | O | | O |
| D5 | 4 | | O | O | | | O | O | | O |
| D5 | 5 | | O | O | O | | O | O | | |
| D4 | 1 | | | | | | O | | | O |
| D4 | 2 | | O | | | | O | | | O |
| D4 | 3 | | O | | | | O | O | | O |
| D4 | 4 | | O | O | | | O | O | | O |
| 3 | 1 | | | | | O | O | | | O |
| 3 | 2 | | O | | | O | O | | | O |
| 3 | 3 | | O | | | O | O | O | | O |
| 2 | 1 | O | | | | O | O | | | O |
| 2 | 2 | | O | O | | O | O | | | O |
| L | 1 | O | | | | O | O | | | O |

O : ACTIVATED

FIG.20B

| SOLENOID VALVES / SHIFT STAGES | S1 | S2 | S3 | S4 | S7 UPSHIFT | S7 DOWNSHIFT |
|---|---|---|---|---|---|---|
| 1,2,3,4,5 | OFF | OFF | OFF | OFF | OFF | OFF |
| 1↔2 | ON | OFF | OFF | OFF | ON→OFF | OFF→ON |
| 2↔3 | OFF | ON | OFF | OFF | ON→OFF | OFF→ON |
| 3↔4 | OFF | OFF | ON | OFF | ON→OFF | OFF→ON |
| 4↔5 | OFF | OFF | ON | ON | ON→OFF | OFF→ON |
| 3↔5 | OFF | OFF | ON | ON | ON→OFF | OFF→ON |
| 2↔5 | OFF | ON | ON | ON | ON→OFF | OFF→ON |
| 2↔4 | OFF | ON | ON | OFF | ON→OFF | OFF→ON |
| 1↔5 | ON | ON | ON | ON | ON→OFF | OFF→ON |
| 1↔4 | ON | ON | ON | OFF | ON→OFF | OFF→ON |
| 1↔3 | ON | ON | OFF | OFF | ON→OFF | OFF→ON |

AUTOMATIC TRANSMISSION SYSTEM FOR AUTOMOTIVE VEHICLE

BACKGROUND OF THE INVENTION

1. Field of the Invention

This invention relates to an automatic transmission system for automotive vehicle and, more particularly, to an automatic transmission system wherein four solenoid valves are adopted to control shift valves such that a construction of the system can be simplified and shift feeling can be improved.

2. Description of the Conventional Art

A conventional automatic transmission for an automotive vehicle has a torque converter and a multiple stage transmission gear mechanism connected to the torque converter. The torque converter includes hydraulically activated friction elements for selecting one of the gear stages of a transmission gear mechanism according to the vehicles operating condition.

A hydraulic control system pressurized by a hydraulic pump provides the hydraulic pressure required to operate the friction elements and control valves.

A commonly used automatic transmission of a vehicle has a hydraulic torque converter which generally includes a pump impeller connected with an engine output shaft to be driven thereby, a turbine runner with an output shaft member, and a stator disposed between the pump impeller and the turbine runner, so that the fluid is circulated by the engine driven pump impeller through the turbine runner with the aid of the stator which functions to deflect the fluid from the turbine runner to a direction where the fluid flow does not disturb the rotation of the pump impeller when the fluid flows into the pump impeller.

Automatic shifting is performed by operating the friction elements such as clutches or a kick-down brake at each shifting stage.

Also, a manual valve (where ports are converted by selecting a position of the selector lever), is supplied with fluid from the hydraulic pump and supplies the fluid to a shift control valve.

U.S. Pat. No. 3,754,482 discloses one of the automatic transmissions described above having first and second shifting devices, wherein two friction elements among four friction elements are activated, selectively, to perform several speed stages.

Because known automatic transmission systems of the kind explained above can perform four forward speed stages and one reverse speed stage only, it is difficult to improve power transmission efficiency; and, because the systems cannot perform skip shifting, they exhibit slow responsiveness.

These conventional automatic transmission systems have a complicated valve body construction. Thus, the valve body is expensive and difficult to manufacture because there are many valves in the systems. Also, shift feeling is not good when shifting a speed stage.

SUMMARY OF THE INVENTION

An object of the invention is to solve the above-mentioned problems of the conventional system. Provided for this purpose is an automatic transmission system which can perform five forward speeds and one reverse speed and can perform skip shifting such that shifting responsiveness can be improved.

Another object of the invention is to provide an automatic transmission system wherein four solenoid valves are adopted to control shift valves and control is performed sequentially. By doing so the construction of the system can be simplified and shift feeling can be improved.

In order to accomplish these and other objectives, the invention provides an automatic transmission for an automotive vehicle comprising a hydraulic pump driven by an engine for pressurizing fluid; a pressure regulating valve for varying hydraulic pressure supplied from the hydraulic pump when driving the vehicle forward or rearward; a torque converter for transmitting power from the engine to an input shaft of the transmission; a converter clutch regulator valve for activating a damper clutch to improve a transmission efficiency of the torque converter; a solenoid supply valve for receiving line pressure from the pressure regulating valve and supplying reduced pressure to the first, second, third, fourth, fifth, sixth and seventh solenoid valves; a first friction element commonly activated at each speed stage; a second, third, fourth, fifth, sixth, seventh, eighth, and ninth friction elements, at least one of which is activated according to the speed stages; a torque control regulator valve for supplying torque pressure required to activate the friction elements; a manual valve; first-to-second, second-to-third, third-to-fourth, and fourth-to-fifth speed shift valves for selectively supplying the torque pressure supplied from the torque control regulator valve, or drive pressure regulated by the pressure regulating valve and supplied from the manual valve to the friction elements according to ON/OFF operations of the first, second, third, and fourth solenoid valves to shift speed; and second and third speed clutch valves, a fourth band valve and an over-drive unit valve controlled by the torque pressure for supplying activating pressure to the friction elements of the respective speed stages and supplying the activating pressure of next speed stages to the shift valves, wherein the manual valve supplies the line pressure regulated by the pressure regulating valve according to a position of a shift lever to the torque control regulator valve, the clutch valves, and the band valve or to the first and sixth friction elements.

Also, the present invention provides the automatic transmission system with a reverse clutch inhibitor valve. The valve keeps the vehicle from being driven rearward when a reverse range is selected at a driven range by obstructing the supply of hydraulic pressure to the ninth friction element. The hydraulic fluid is disposed in a reverse pressure conduit through which hydraulic pressure is supplied to the eighth friction element to provide an emergency safety means.

Also, the present invention provides the automatic transmission system (wherein the torque control regulator valve comprises a pressure chamber for receiving hydraulic pressure controlled by the sixth solenoid valve) with a first spool for selectively obstructing the torque pressure supplied to the first-to-second shift valve; a second spool for which pressure in the pressure chamber is applied; a first elastic member for biasing the first spool; and a second elastic member disposed between the first spool and the second spool to support the first and second spools elastically, said second elastic member exerting an elastic force larger than that of the first elastic member.

Also, the present invention provides the automatic transmission system (wherein the first-to-second shift valve comprises first and second ports for receiving control pressure from the second-to-third shift valve) with a third port for receiving the torque pressure from a torque pressure conduit; a fourth port for receiving the drive pressure from the second clutch valve; a fifth port for transmitting the torque pressure to the second-to-third shift valve; a sixth port for transmitting the torque pressure or the drive pressure to the second clutch valve selectively; and a spool for opening or closing the ports according to a variation of pressure in a pressure chamber controlled by the first solenoid valve.

Also, the present invention provides an automatic transmission system wherein the second-to-third shift valve comprises first and second ports connected to branch conduits of a control conduit;

a third port for receiving the torque pressure from the first-to-second shift valve; a fourth port for receiving drive pressure from the third clutch valve; a fifth port transmitting the torque pressure to the third-to-fourth shift valve; a sixth port for transmitting pressure to the third clutch valve; a seventh port for transmitting control pressure to the first-to-second shift valve; and a spool for opening or closing the ports according to a variation of pressure in a pressure chamber controlled by the second solenoid valve.

Also, in the present invention the automatic transmission system is comprised of the third-to-fourth shift valve comprising first and second ports connected to branch conduits of the control conduit; a third port for receiving the torque pressure from the second-to-third shift valve; a fourth port for receiving drive pressure from the fourth band valve; a fifth port for transmitting the torque pressure to the fourth-to-fifth shift valve; a sixth port for transmitting pressure to the fourth band valve; a seventh port for transmitting control pressure to the fourth-to-fifth shift valve; and a spool for opening or closing the ports according to a variation of pressure in a pressure chamber controlled by the third solenoid valve.

Also, in the present invention the automatic transmission system is comprised of the fourth-to-fifth shift valve comprising first and second ports connected to branch conduits of the control conduit; a third port for receiving the torque pressure from the third-to-fourth shift valve; a fourth port for receiving drive pressure from the over-drive unit valve; a fifth port for transmitting pressure to the over-drive unit valve; and a spool for opening or closing the ports according to a variation of pressure in a pressure chamber controlled by the fourth solenoid valve.

Also, in the present invention the automatic transmission system is comprised of the first solenoid valve which controls hydraulic pressure in a pressure chamber of the first-to-second shift valve, the second solenoid valve which controls hydraulic pressure in a pressure chamber of the second-to-third shift valve, the third solenoid valve which controls hydraulic pressure in a pressure chamber of the third-to-fourth shift valve, and the fourth solenoid valve which controls hydraulic pressure in a pressure chamber of the fourth-to-fifth shift valve to transmit the torque pressure and drive pressure sequentially.

Also, the present invention provides the automatic transmission system wherein the manual valve has modes for "P", "R", "N", "D", "3", "2", and "L" ranges.

Also, the present invention provides the automatic transmission system wherein the manual valve can be shifted to the "D", "3", "2", and "L" ranges manually.

Also, the present invention provides the automatic transmission system wherein the drive pressure is supplied to the first and sixth friction elements directly at a first speed of the "D" range.

Also, the present invention provides the automatic transmission system wherein the first solenoid valve for controlling the first-to-second shift valve is controlled to an OFF state to supply the drive pressure to friction elements which are activated at a first speed stage and to a second friction element at a second speed of the "D" range.

Also, the present invention provides the automatic transmission system wherein the second solenoid valve for controlling the second-to-third shift valve is controlled to an OFF state to supply the drive pressure to friction elements which are activated at a second speed stage and to a third friction element at a third speed of the "D" range.

Also, the present invention provides the automatic transmission system wherein the third solenoid valve for controlling the third-to-fourth shift valve is controlled to an OFF state to supply the drive pressure to friction elements which are activated at a third speed stage and to a fourth friction element at a fourth speed of the "D" range.

Also, the present invention provides the automatic transmission system wherein the fourth solenoid valve for controlling the fourth-to-fifth shift valve is controlled to an OFF state to obstruct hydraulic pressure supplied to the sixth friction element and to supply the drive pressure to friction elements which are activated at a fourth speed stage and to a fifth friction element at a fifth speed of the "D" range.

Also, the present invention provides the automatic transmission system wherein the first and second solenoid valves for controlling the first-to-second and second-to-third shift valves, respectively, are controlled to OFF states and the third and fourth solenoid valves for controlling the third-to-fourth and fourth-to-fifth shift valves, respectively, are controlled to ON states to enable a third-to-fourth skip shifting at the "D" range.

Also, the present invention provides the automatic transmission system wherein the first solenoid valve for controlling the first-to-second shift valve is controlled to an OFF state and the second, third and fourth solenoid valves for controlling the second-to-third, third-to-fourth and fourth-to-fifth shift valves, respectively, are controlled to ON states to enable a second-to-fifth skip shifting at the "D" range.

Also, the present invention provides the automatic transmission system wherein the first and fourth solenoid valves for controlling the first-to-second and fourth-to-fifth shift valves, respectively, are controlled to OFF states and the second and third solenoid valves for controlling the second-to-third and third-to-fourth shift valves, respectively, are controlled to ON states to enable a second-to-fourth skip shifting at the "D" range.

Also, the present invention provides the automatic transmission system wherein the first, second, third and fourth solenoid valves for controlling the first-to-second, second-to-third, third-to-fourth and fourth-to-fifth shift valves, respectively, are controlled to ON states to enable a first-to-fifth skip shifting at the "D" range.

Also, the present invention provides the automatic transmission system wherein the first, second and third solenoid valves for controlling the first-to-second, second-to-third, and third-to-fourth shift valves, respectively, are controlled to ON states and the fourth solenoid valve for controlling the fourth-to-fifth shift valve is controlled to an OFF state to enable a first-to-fourth skip shifting at the "D" range.

Also, the present invention provides the automatic transmission system wherein the first and second solenoid valves for controlling the first-to-second and second-to-third shift valves, respectively, are controlled to ON states and the third and fourth solenoid valves for controlling the third-to-fourth and fourth-to-fifth shift valves, respectively, are controlled to OFF states to enable a first-to-third skip shifting at the "D" range.

Also, the present invention provides the automatic transmission system wherein the solenoid supply valve has a spool, an elastic member for biasing the spool to regulate hydraulic pressure supplied from the solenoid supply valve, and a screw for compressing or releasing the elastic member.

BRIEF DESCRIPTION OF THE DRAWINGS

FIG. 2D is an enlarged view of a second shift control section of the hydraulic control system of FIG. 1.

FIG. 20A is a table of friction elements and their operation for each speed stage.

FIG. 20B is a table of solenoid valves and their operation for each speed stage.

DETAILED DESCRIPTION OF THE PREFERRED EMBODIMENT

Following are the descriptions with reference to the attached drawings wherein the same numbering systems are used to represent the same component parts.

In the figures, EX denotes exhaust ports.

Figure 1:
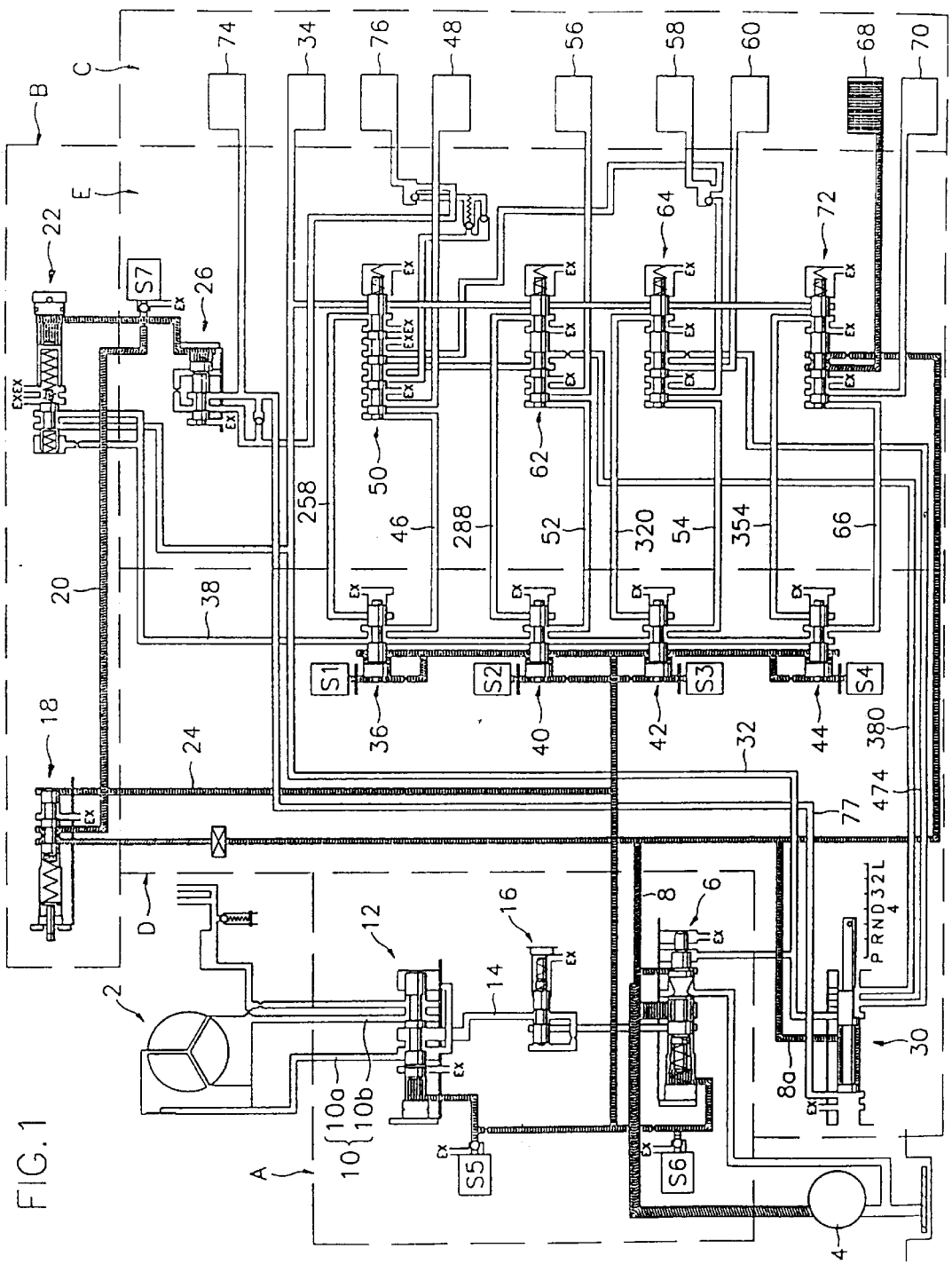
FIG. 1 is a schematic view of a hydraulic control system according to an embodiment of the invention at an "N" (neutral) range.

Referring to FIG. 1 illustrating a hydraulic control system according to an embodiment of the invention at an "N" (neutral) range, the hydraulic control system includes a torque converter 2 located between a crank shaft and a transmission for transmitting the engine power; a hydraulic pump 4 having a drive gear fixed to a pump drive hub of the torque converter for rotation therewith and a driven gear engaged with the drive gear; a damper clutch control section A for activating or deactivating a damper clutch of the torque converter 2 by regulating hydraulic pressure generated at the hydraulic pump 4; a torque pressure conversion section B for reducing hydraulic pressure supplied to first, second, third and fourth solenoid valves S1, S2, S3 and S4 to convert drive pressure supplied from the hydraulic pump 4 to levels required for activating friction elements; and shift stage friction elements section C and first and second shift control sections D and E whereto torque pressure or drive pressure is selectively supplied.

A pressure regulating valve 6 for regulating line pressure when changing mode from a neutral N range to drive or reverse ranges is connected to an outlet of the hydraulic pump 4 via a conduit 8.

A pressure regulating valve 6 is connected via conduit 14 to a converter clutch regulator valve 12 which supplies hydraulic pressure to the torque converter 2 through conduit 10. A converter feed valve 16 for supplying or obstructing hydraulic pressure is installed in conduit 14.

A spool of the converter clutch regulator valve 12 is displaced by fifth solenoid valve S5 which is controlled by a transmission control unit (TCU: not shown) (hereinafter referred to as "TCU") to make one of the conduits 10a and 10b of conduit 10 to communicate with conduit 14 and to activate or deactivate the damper clutch of the torque converter 2.

Conduit 8 is further extended and connected to the a solenoid supply valve 18 of the torque pressure conversion section B to reduce the line pressure. A portion of the pressurized fluid whose pressure is reduced during its passage through the solenoid supply valve 18 can be supplied to a torque converter regulator valve 22.

Also, a control conduit 24 branched from a conduit 20 is connected to the pressure regulating valve 6 and converter clutch regulator valve 12 to allow control pressure to be supplied therethrough. The control pressure can be regulated by the fifth and a sixth solenoid valves S5 and S6.

A spool of the torque converter regulator valve 22 is displaced by a seventh solenoid valve S7 which is controlled by the TCU. The solenoid valve S7 opens or closes conduit 20 to apply or release hydraulic pressure which exerts a force on the spool of the torque converter regulator valve 22.

Conduit 20 is further extended from the seventh solenoid valve S7 to provide hydraulic connection for applying hydraulic pressure on a spool of reverse inhibitor valve 26. A reverse inhibitor valve 26 is an emergency safety valve which prevents the vehicle from being driven rearward when shift lever is selected to the reverse range by error while driving forward, and this operation is made possible by virtue of the seventh solenoid valve S7 which is ON/OFF-controlled by the TCU.

A manual valve 30 has modes for "P", "R", "N", "D", "3", "2", and "L" ranges, and hydraulic connections are provided to supply hydraulic pressure to a drive pressure conduit 32 at the "D", "3", "2" and "L" ranges.

The drive pressure conduit 32 is connected to the torque converter regulator valve 22 and to a first friction element 34 of the shift stage friction element section C.

Also, the drive pressure conduit 32 is connected to a first-to-second shift valve 36, and the first-to-second shift valve 36 is connected via a torque pressure conduit 38 to the torque converter regulator valve 22 to receive hydraulic pressure from the drive pressure conduit 32 according to an operation of the torque converter regulator valve 22.

The control conduit 24 which is connected to conduit 20 to control the pressure regulating valve 6 and the converter clutch regulator valve 12 is connected to a second-to-third and a third-to-fourth shift valves 40 and 42. The second-to-third shift valve 40 is connected to the first-to-second shift valve 36, and the third-to-fourth shift valve 42 is connected to a fourth-to-fifth shift valve 44.

The first-to-second shift valve 36 is connected via a conduit 46 to a second clutch valve 50 which supplies hydraulic pressure to a second friction element 48. Also, the second-to-third and third-to-fourth shift valves 40 and 42 are connected via conduits 52 and 54 to a third clutch valve 62 and a fourth band valve 64 which supply hydraulic pressure to a third friction element 56 and a fourth and fifth friction elements 58 and 60, respectively. Further, a fourth-to-fifth shift valve 44 is connected via conduit 66 to an over-drive unit valve 72 which supplies hydraulic pressure to a sixth and a seventh friction elements 68 and 70.

The shift stage friction element section C includes an eighth friction element 74 which is connected to reverse pressure conduit 76 which is connected to the manual valve 30 to receive hydraulic pressure therefrom and a ninth friction element 76. The eighth friction element 74 is a reverse friction element which is activated at a reverse mode only, and the ninth friction element 76 is a low reverse clutch.

Figure 2A:
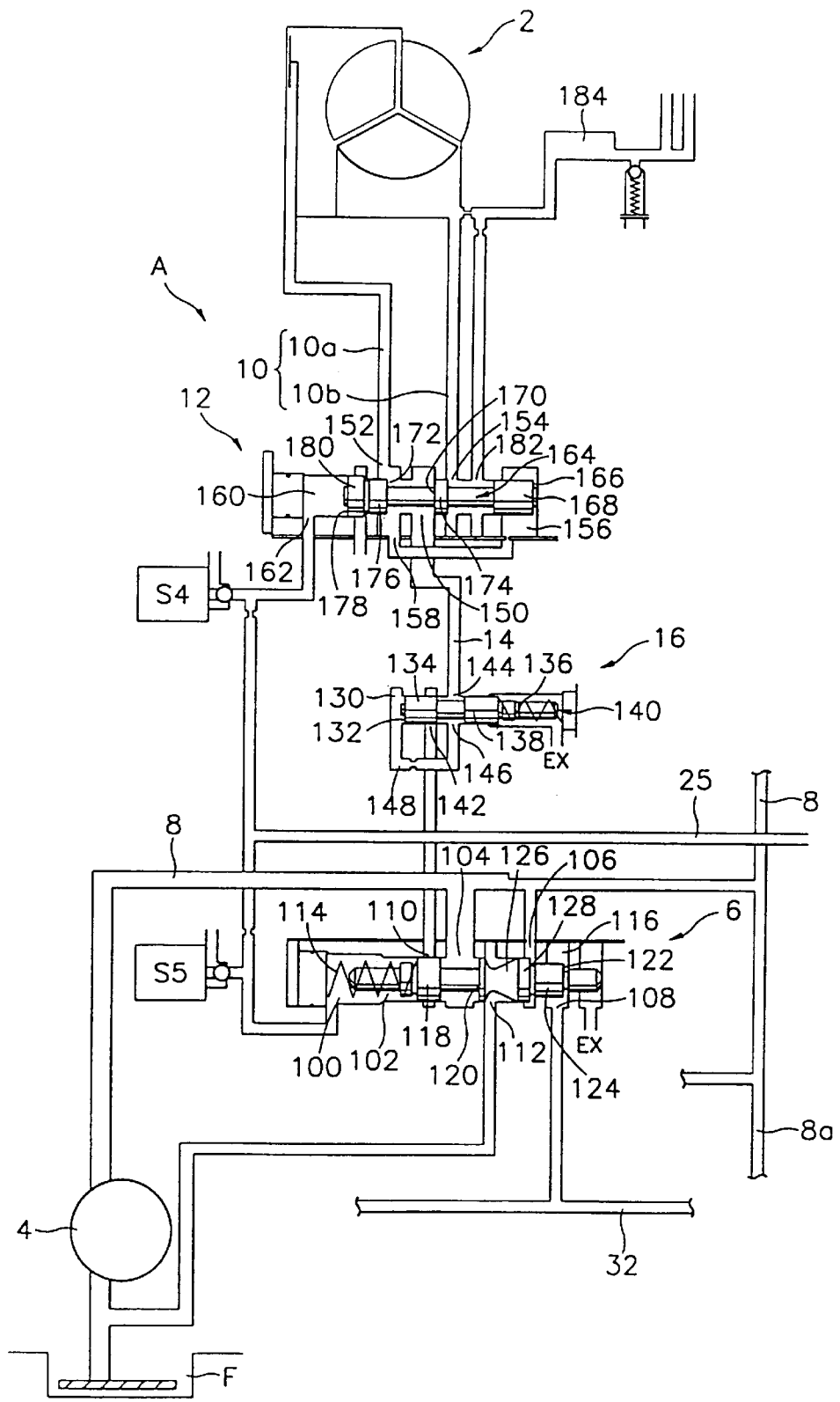
FIG. 2A is an enlarged view of a damper clutch control section of the hydraulic control system of FIG. 1.

Referring to FIG. 2A, the pressure regulating valve 6 of damper clutch control section A has a pressure chamber 100 and a spool 102. The pressure regulating valve 6 has first and second ports 104 and 106 which communicates with line pressure conduit 8 directly, a third port 108 which communicates with the drive pressure conduit 32 such that drive pressure is applied thereto, a fourth port 110 communicating with a converter feed valve 16, and a fifth port 112 for reducing the line pressure when the line pressure is increased too high.

The spool 102 is elastically biased rightward by an elastic member 114 disposed in the pressure chamber 100 which is supplied with hydraulic pressure according to ON/OFF operation of the sixth solenoid valve S6. Another pressure chamber 116 receives drive pressure via a third port 108, and the hydraulic pressure in this pressure chamber 116 acts against the hydraulic pressure in pressure chamber 100 such that the spool 102 is displaced according to the ON/OFF operation of the sixth solenoid valve S6.

When the sixth solenoid valve S6 is controlled to an OFF state and hydraulic pressure in the pressure chamber 100 is increased, spool 102 is displaced rightward because a sum of forces exerted by the hydraulic pressure in the pressure chamber 100 and elastic member 114 becomes larger than that exerted by hydraulic pressure in the pressure chamber 116. However, when the sixth solenoid valve S6 is controlled to an ON state and hydraulic pressure in the pressure chamber 100 is decreased, the spool 102 is displaced leftward because the force exerted by the elastic member 1 14 becomes smaller than that exerted by hydraulic pressure in the pressure chamber 116.

This displacement of the spool 102 makes lands of the spool 102 open or close first, second, third, fourth and fifth ports 104, 106, 108, 110 and 112, respectfully.

The spool 102 includes a first land 118 for opening or closing the fourth port 110, a second land 120 for opening or closing the fifth port 112, and a third land 124 which has a pressure face 122 on which the hydraulic pressure in the pressure chamber 116 is applied. A fourth land 128 having an inclined face 126 is integrally formed between the second land 120 and the third land 124. The inclined face 126 prevents hydraulic pressure from being exhausted abruptly when exhausting hydraulic pressure through the fifth port 112, an exhaust port, in case hydraulic pressure coming through the first port 104 is increased.

The converter feed valve 16 which receives hydraulic pressure from the fourth port 110 includes a spool 140 having a first land 134 with a pressure face 132 on which hydraulic pressure in a pressure chamber 120 is applied and includes a second land 138 biased by an elastic member 136.

The first land 134 opens or closes first port 142 which is communicated with fourth port 110 of pressure regulating valve 6 to obstruct hydraulic pressure flowing through second port 144, selectively. This operation is performed by means of pressure variation within pressure chamber 130 which is communicated with bypass conduit 148 at third port 146.

When hydraulic pressure within a pressure chamber 130 is decreased, the spool 140 is displaced leftward by the elastic member 136 such that first and second ports 142 and 144 are opened. However, when the hydraulic pressure within the pressure chamber 130 is increased and it overcomes the elastic force by the elastic member 136, the spool 140 is displaced rightward such that these ports 142 and 144 are closed.

The converter clutch regulator valve 12 which receives hydraulic pressure from the converter feed valve 16 includes a first port 150 communicating with the conduit 14, second and third ports 152 and 154 communicating with the torque converter 2, a fourth port 158 for bypassing hydraulic pressure coming through the first port 150 to a pressure chamber 156, and a fifth port 162 for supplying hydraulic pressure to another pressure chamber 160 which receives hydraulic pressure from the control conduit 24.

A spool 164 of the converter clutch regulator valve 12 includes a first land 168 having a pressure face 166 on which hydraulic pressure in the pressure chamber 156 is applied, second and third lands 174 and 176 having pressure faces 170 and 172 on which hydraulic pressure coming through the first port 150 is applied, and a fourth land 180 having a pressure face 178 on which hydraulic pressure in the pressure chamber 160 is applied.

Hydraulic pressure in the pressure chamber 160 is obstructed according to ON/OFF control of the fifth solenoid valve S5, selectively, to displace the spool 164 leftward or rightward and to open or close the ports.

A sixth port 182 is located adjacent to the third port 154. Hydraulic pressure exhausted through the sixth port 182 is cooled down as it passes through a cooler 184 and is supplied to a power train part where the shift stage friction element section C is located and to an axle of the vehicle to provide lubrication for these parts.

Figure 2B:
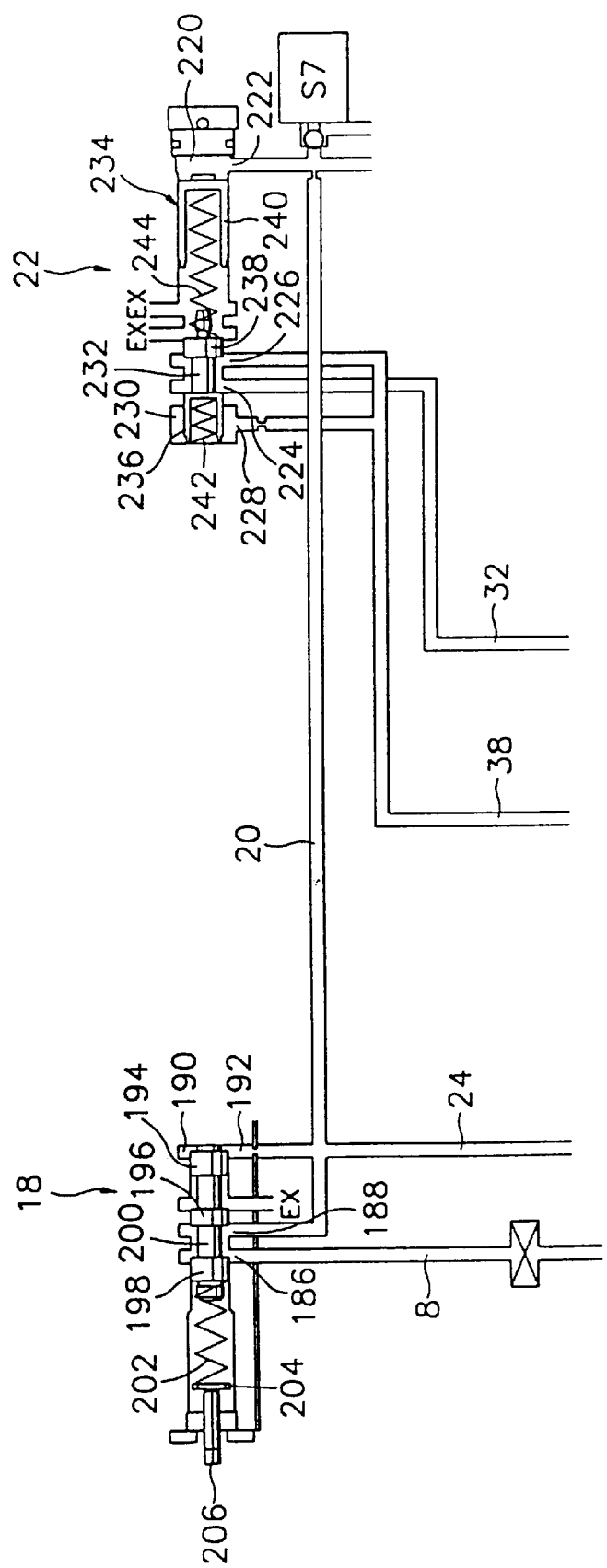
FIG. 2B is an enlarged view of a torque pressure conversion section of the hydraulic control system of FIG. 1.

Referring to FIG. 2B illustrating the torque pressure conversion section B, the solenoid supply valve 18 includes a first port 186 through which line pressure supplied from the conduit 8 is supplied, a second port 188 which is communicating with a first port 186 selectively and communicating with the conduit 20, and a third port 192 which receives hydraulic pressure from the conduit 20 and supplies hydraulic pressure to a pressure chamber 190.

Also, the solenoid supply valve 18 includes a spool 200 having a first land 194 on which hydraulic pressure in the pressure chamber 190 is applied and second and third lands 196 and 198 which open or close first and second ports 186 and 188. The spool 200 is biased by an elastic member 202 which acts against the hydraulic pressure in the pressure chamber 190.

The elastic member 202 is disposed between the third land 198 and a pushing plate 204. A screw 206 for adjusting the elastic force exerted by the elastic member 202 acting against hydraulic pressure in the pressure chamber 190 is abutted on the pushing plate 204.

The torque control regulator valve 22 which receives control pressure from the conduit 20 includes a first port 222 connected to a pressure chamber 220 which communicates with the conduit 20, a second port 224 connected to the drive pressure conduit 32, and third and fourth ports 226 and 228 connected to the first-to-second shift valve 36.

The fourth port 228 of the torque converter regulator valve 22 communicates with a pressure chamber 230. A first spool 232 is positioned beside the pressure chamber 230 to open or close the second, third and fourth ports 224, 226 and 228, and a second spool 234 is positioned beside the pressure chamber 220 to open or close the first port 222.

The first spool 232 has a cup-shaped plug 236 and a first land 238, and the second spool 234 has a cup-shaped plug 240 and a disposed coaxial with the first spool 232. These cup-shaped plugs 236 and 240 are biased by a first and second elastic member 242 and 244, respectively.

The second elastic member 244 is disposed between the plug 240 and the first land 238 and is compressed when hydraulic pressure in the pressure chamber 220 is applied on a backside of the plug 240 to influence displacement of the first spool 232.

That is, the first elastic member 242 is compressed when the compression force of the second elastic member 244 is applied on the first spool 232 to displace the first spool 232 leftward in FIG. 2B, and, for this, an elastic force of the second elastic member 244 is made larger than that of the first elastic member 242.

Figure 2C:
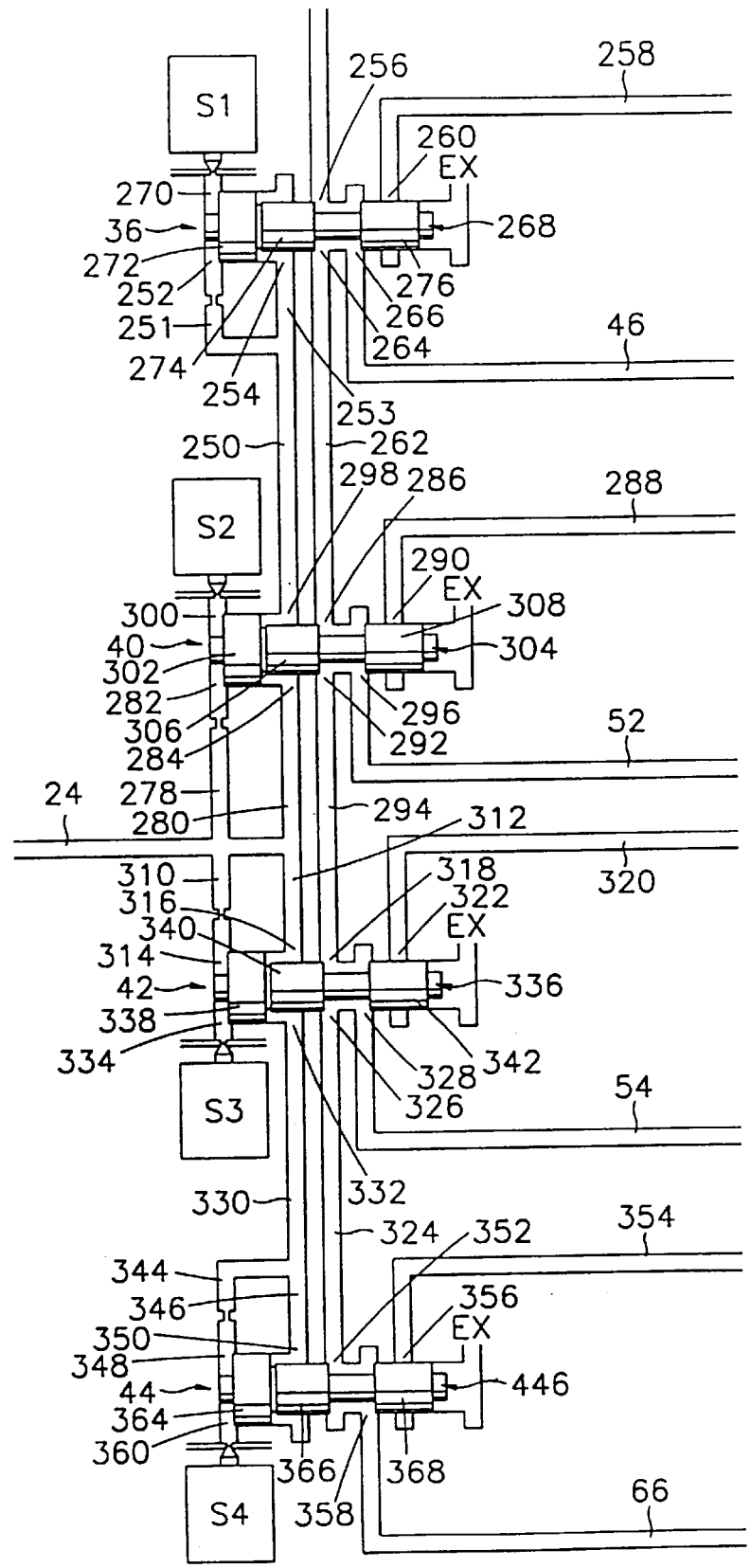
FIG. 2C is an enlarged view of a first shift control section of the hydraulic control system of FIG. 1.

Referring to FIG. 2C illustrating the first shift control section D, the first-to-second shift valve 36 which receives torque pressure from the torque pressure conduit 38 which includes first and second ports 252 and 254 communicating with branch conduits 251 and 253 of a conduit 250 communicating with the second-to-third shift valve 40 to receive control pressure, a third port 256 communicating with the torque pressure conduit 38 to receive torque pressure, a fourth port 260 connected via a conduit 258 to the second clutch valve 50 to receive drive pressure, a fifth port 264 connected via a conduit 262 to the second-to-third shift valve 40 to transmit torque pressure, and a sixth port 266 communicating with the second clutch valve 50 via the conduit 46 to supply torque pressure or drive pressure.

A spool 268 of the first-to-second shift valve 36 includes a first land 272 located in a pressure chamber 270, a second land 274 which together with the first land 272 regulates an opening degree of the second port 254 and opens or closes the third and fifth ports 256 and 264, and a third land 276 which opens or closes the fourth and sixth ports 260 and 266.

The first land 272 has a pressure face larger than that of the other lands such that the spool 268 can be displaced rightward by hydraulic pressure in the pressure chamber 270.

Hydraulic pressure is supplied to the pressure chamber 270 via an orifice in the branch conduit 251, and the hydraulic pressure in the pressure chamber 270 is increased or decreased according to the ON/OFF operation of solenoid valve S1.

The second-to-third shift valve 40 which receives hydraulic pressure from the control conduit 24 includes first and second ports 282 and 284 which communicate with conduits 278 and 280 branched from the control conduit 24, a third port 286 communicates with the first-to-second shift valve 36 via the conduit 262 to receive torque pressure, a fourth port 290 communicating with the third clutch valve 62 via a conduit 288 to receive drive pressure, a fifth port 292 which supplies torque pressure to the third-to-fourth shift valve 42 via a conduit 294, a sixth port 296 which supplies hydraulic pressure to the third clutch valve 64 via the conduit 52, and a seventh port 298 which communicates with the first-to-second shift valve 36 via conduit the 250 to supply control pressure.

The second-to-third shift valve 40 has a pressure chamber 300 which receives hydraulic pressure through an orifice of the branch conduit 278 of the control conduit 24. Hydraulic pressure in the pressure chamber 300 is increased or decreased according to an ON/OFF operation of the second solenoid valve S2.

A spool 304 of the second-to-third shift valve 40 includes a first land 302 located in the pressure chamber 300, a second land 306 which together with the first land 304 regulates the opening degree of the second and seventh port 284 and 298 and opens or closes the third and fifth ports 286 and 292, and a third land 308 which opens or closes the fourth and sixth ports 290 and 296.

The third-to-fourth shift valve 42 which receives hydraulic pressure from the control conduit 24 includes first and second ports 314 and 316 which communicates with conduits 310 and 312 branched from the conduit 24, a third port 318 which communicates with the second-to-third shift valve 40 via the conduit 294 to receive torque pressure, a fourth port 322 which communicates with the fourth band valve 64 via a conduit 320 to receive drive pressure, a fifth port 326 which supplies torque pressure to the fourth-to-fifth shift valve 44 via a conduit 324, a sixth port 328 which supplies hydraulic pressure to the fourth band valve 64 via the conduit 54, and a seventh port 332 which communicates with a conduit 330 to supply control pressure to the fourth-to-fifth shift valve 44.

The third-to-fourth shift valve 42 has a pressure chamber 334 which receives hydraulic pressure through an orifice of the branch conduit 310 of the control conduit 24. Hydraulic pressure in the pressure chamber 334 is increased or decreased according to an ON/OFF operation of third solenoid valve S3.

A spool 336 of the third-to-fourth shift valve 42 includes a first land 338 located in the pressure chamber 334, a second land 340 which together with the first land 338 regulates an opening degree of the second and seventh ports 316 and 332 and opens or closes the third and fifth ports 318 and 326, and a third land 342 which opens or closes the fourth and sixth ports 322 and 328.

The fourth-to-fifth shift valve 44 includes first and second ports 348 and 350 which communicates with conduits 344 and 346 branched from the control conduit 330, a third port 352 which communicates with the third-to-fourth shift valve 42 via the conduit 324 to receive torque pressure, a fourth port 356 which communicates with the over-drive unit valve 72 via a conduit 354 to receive drive pressure, and a fifth port 358 which supplies hydraulic pressure to the over-drive unit valve through the conduit 66.

The fourth-to-fifth shift valve 44 has a pressure chamber 360 which receives hydraulic pressure through an orifice of the branch conduit 344 of the control conduit 330. Hydraulic pressure in the pressure chamber 360 is increased or decreased according to an ON/OFF operation of the fourth solenoid valve S4.

A spool 446 of the fourth-to-fifth shift valve 44 includes a first land 364 located in the pressure chamber 360, a second land 366 which together with the first land 364 regulates an opening degree of the second port 350 and opens or closes the third port 352, and a third land 368 which opens or closes the fourth port 356.

Figure 2D:
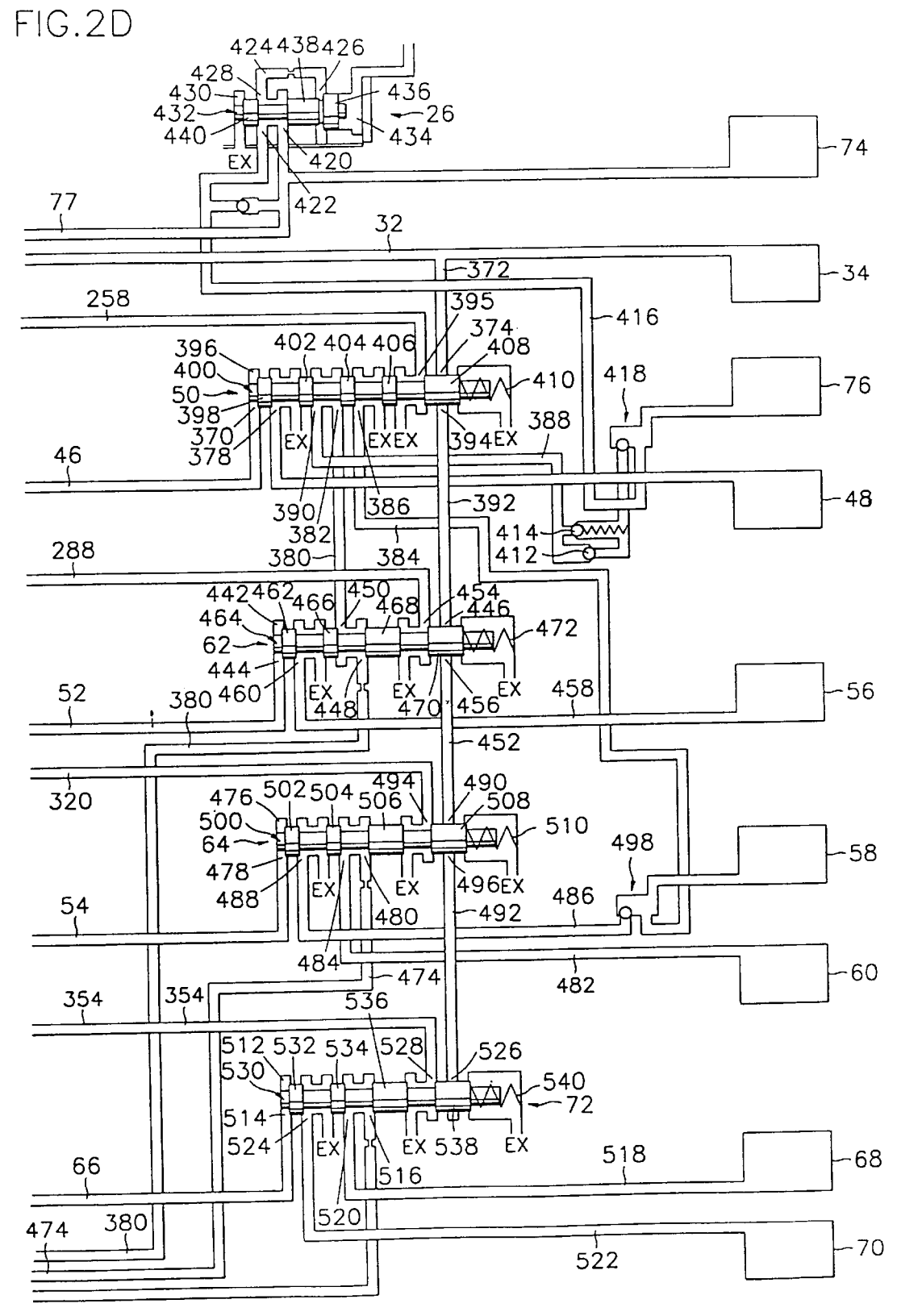

Referring to FIG. 2D illustrating the second shift control section E, the second clutch valve 50 includes a first port 370 which communicates with the conduit 46 which is connected to the sixth port 266 of the first-to-second shift valve 36 to receive hydraulic pressure, a second port 374 connected to a branch conduit 372 of the drive pressure conduit 32 to receive hydraulic pressure, a third port 378 which communicates with a conduit 376 connected to the second friction element 48, a fourth port 382 which receives hydraulic pressure supplied along a conduit 380 connected from the manual valve 30 through the third clutch valve 62 to activate the fourth friction element 58 when the shift lever is selected to the "2" range, a fifth port 386 connected to conduit 384 to supply the hydraulic pressure to fourth friction element 58, a sixth port 390 connected to a conduit 388 to receive hydraulic pressure supplied along a conduit 380 connected from the manual valve 30 through the third clutch valve 62 and supply the hydraulic pressure to the ninth friction element 74 to activate the same when the shift lever is selected to "2" or "L" ranges, and seventh and eighth ports 394 and 395 connected to the third and second clutch valves 62 and 36 to supply drive pressure.

A spool 400 includes a first land 398 on which hydraulic pressure in a pressure chamber 396 is applied directly, second and third lands 402 and 404 which supply hydraulic pressure to the fourth port 382 through the fifth or sixth ports 396 or 390, selectively, fourth and fifth lands 406 and 408 which supply hydraulic pressure to the second port 374 through the seventh or eighth ports 394 or 395. The spool 400 is biased by an elastic member 410 acting against the hydraulic pressure in the pressure chamber 396 which is applied on the first land 398 to prevent the spool 400 from being displaced abruptly.

Hydraulic pressure from a fifth port 390 can be supplied to the ninth friction element 76 through the conduit 388. Two check valves 412 and 414 of opposite flow directions and a shuttle valve 418 which prevents hydraulic pressure supplied from the reverse clutch inhibitor valve 26 to the ninth friction element 76 via a conduit 416 from flowing in a reverse direction toward the conduit 416 are installed in the conduit 388.

The reverse clutch inhibitor valve 26 includes a first port 420 which receives hydraulic pressure from the reverse pressure conduit 77, a second port 422 which supplies reverse pressure to the ninth friction element 76 via the conduit 416, and third and fourth ports 426 and 428 which connect a bypass conduit 424. The spool 432 can be displaced by hydraulic pressure in a pressure chamber 434 which is regulated according to an ON/OFF operation of the seventh solenoid valve S7 and applied on a first land 436.

The spool 432 has second and third lands 438 and 440 which have cross sections smaller than that of the first land 436, and hydraulic pressure flowing through the first and second ports 420 and 422 is applied on the second and third lands 438 and 440.

The third clutch valve 62 which receives hydraulic pressure from the sixth port 296 of the second-to-third shift valve 40 via a conduit 52 includes a first port 444 which receives the hydraulic pressure and supplies the hydraulic pressure to a pressure chamber 442, a second port 446 which receives hydraulic pressure from the seventh port 394 of the second clutch valve 50 via a conduit 392, a third port 448 which communicates with the conduit 380 which is connected to the manual valve 30, a fourth port 450 which transmits hydraulic pressure supplied from the third port 448 through the conduit 380, fifth and sixth ports 454 and 456 which supply drive pressure to the third-to-fourth shift valve 40 and the fourth band valve 64 through conduits 288 and 452, and a seventh port 460 which transmits hydraulic pressure supplied to the first port 444 to the third friction element 56 through a conduit 458.

A spool 464 includes a first land 462 on which hydraulic pressure in the pressure chamber 442 is applied and which makes hydraulic pressure supplied through the first port 444 transmitted to the seventh port 460, selectively, second and third lands 466 and 468 which cause the third port 448 to communicates with the fourth port 450, selectively, and a fourth land 470 which causes the second port 446 to connect to the fifth and sixth ports 454 and 456. This spool 464 is biased by an elastic member 472 acting against the hydraulic pressure in the pressure chamber 442 which is applied on the first land 462 to prevent the spool 464 from being displaced abruptly.

The fourth band valve 64 which receives hydraulic pressure from the manual valve 30 via a conduit 474 when the shift lever is selected to "3", "2" or "L" ranges includes a first port 478 which receives hydraulic pressure from the conduit 54 connected to sixth port 328 of the third-to-fourth shift valve 42 and supplies the hydraulic pressure to the pressure chamber 476, a second port 480 connected to the conduit 474, a third port 484 which transmits hydraulic pressure supplied from the second port 480 to the fifth friction element 60 through a conduit 482, a fourth port 488 which transmits hydraulic pressure supplied from the first port 478 to the fourth friction element 58 through a conduit 486, a fifth port 490 which receives drive pressure from the third clutch valve 62 through the conduit 452, and sixth and seventh ports 494 and 496 which transmit hydraulic pressure supplied through the fifth port 490 to the third-to-fourth shift valve 42 and the over-drive unit valve 72 via conduits 320 and 492.

The conduit 54 which is connected to the first port 478 is connected to the conduit 486 to supply hydraulic pressure to the fourth friction element 58 at the fourth and fifth speeds of the "D" range. A shuttle valve 498 is installed in the conduit 486 to prevent hydraulic pressure from flowing toward the conduit 486 through which hydraulic pressure is supplied to the fourth friction element 58 at the "2" range.

A spool 500 of the fourth band valve 64 is displaced by hydraulic pressure in the pressure chamber 476 and includes a first land 502 which transmits hydraulic pressure supplied through the first port 478 to the fourth port 488, selectively, second and third ports 504 and 506 which communicate the second and third ports 480 and 484 with each other, and a fourth land 508 which communicate the fifth port 490 with the sixth and seventh ports 494 and 496. This spool 500 is biased by an elastic member 510 which acts against hydraulic pressure in the pressure chamber 476 to prevent the spool 500 from being displaced abruptly.

The over-drive unit valve 72 supplies hydraulic pressure to the sixth friction element 68 which is activated at all of the speed ranges except the "P" range and a fifth speed of the "D" range and to the seventh friction element 70 which is activated at the fifth speed of the "D" range only. This over-drive unit valve 72 includes a first port 514 through which hydraulic pressure from the fifth port 358 of the fourth-to-fifth shift valve 44 is supplied to a pressure chamber 512, a second port 516 connected to the conduit 8 directly, a third port 520 which transmits hydraulic pressure supplied from the second port 516 to the sixth friction element 68 through conduit a 518, a fourth port 524 which transmits hydraulic pressure supplied from the first port 514 to the seventh friction element 70 through a conduit 522, a fifth port 526 which receives drive pressure from the fourth band valve 64 through the conduit 492, and a sixth port 528 which transmits hydraulic pressure supplied from the fifth port 526 to the fourth port 356 of the fourth-to-fifth shift valve 44 through the conduit 354.

A spool 530 of the over-drive unit valve 72 is displaced by hydraulic pressure in the pressure chamber 512 and includes a first land 532 which transmits hydraulic pressure supplied to the first port 514 to the fourth port 524, selectively, second and third lands 534 and 536 which communicates the second port 516 with the third port 520, and a fourth land 538 which communicates the fifth port 526 with the sixth port 528. This spool 530 is biased by an elastic member 540 which acts against hydraulic pressure in the pressure chamber 512 to prevent the spool 530 from being displaced abruptly.

The solenoid valves S1 through S7 are duty-controlled or ON/OFF-controlled by the TCU according to the vehicle speed or a variation of throttle position.

In the automatic transmission system as described above, fluid from an oil pan F is exhausted from the hydraulic pump 4 as the driven gear of the pump is rotated.

The fluid is transmitted to the torque converter regulator valve 22 through the solenoid supply valve 18. Hydraulic pressure flowing through the control conduit 24 branched from the conduit 20 acts as control pressure for pressure regulating the valve 6 and converter clutch regulator valve 12. A portion of pressurized fluid is transmitted to the first-to-second and the fourth-to-fifth shift valves 36 and 44 via the second-to-third and the third-to-fourth shift valves 40 and 42 of the first shift control section D.

Also, a portion of the pressurized fluid exhausted from the hydraulic pump 4 is transmitted to the manual valve 30 along a conduit 8a connected to the conduit 8. This flow of pressurized fluid is obstructed at the manual valve 30 and a portion of the pressurized fluid is transmitted to the sixth friction element 68 via the over-drive unit valve 72 when the shift lever is selected to the neutral range.

If the shift lever is selected to the drive range at this state, line pressure in the conduit 8 is regulated by the sixth solenoid valve S6 which is duty-controlled by the TCU.

If a slip occurs at friction elements related to speed shifting, the sixth solenoid valve S6 is controlled to an OFF state which causes hydraulic pressure in the pressure chamber 100 of the pressure regulating valve 6 to increase as shown in FIG. 2A. Then a sum of forces exerted by the hydraulic pressure and elastic member 114 is applied on first land 118 and, thus, makes spool 102 displaced rightward in FIG. 2A.

However if no slip occurs at the friction elements related to the speed shifting, the sixth solenoid valve S6 is duty-controlled which causes the hydraulic pressure in the pressure chamber 100 to exhaust. Then the spool 102 is displaced leftward in FIG. 2A by hydraulic pressure applied on a right side of the third land 124.

Then the second land 120 of the spool 102 becomes located between the first port 104 and the fifth port 112, an exhaust port, to make these ports 104 and 112 communicate with each other, and fluid in the conduit 8 is returned back to the oil pan F.

Driving loss of the hydraulic pump can be minimized by returning this fluid. At this moment, if a slip occurs again at friction elements related to speed shifting, the sixth solenoid valve S6 is controlled to the OFF state which causes the hydraulic pressure in the pressure chamber 100 of the pressure regulating valve 6 to increase. Then the spool 102 is displaced rightward to obstruct the fifth port 112, the exhaust port, and to make the hydraulic pressure in the conduit 8 act as an activating pressure for the friction elements.

This operation is repeated continuously according to whether the slip occurs or not, and, in this process, the first port 104 communicates with the fourth port 110 such that the line pressure in the conduit 8 is transmitted to the first port 142 of the converter feed valve 16.

Because the spool 140 of the converter feed valve 16 is biased by elastic member 136 and displaced rightward slightly in FIG. 2A such that the first port 142 is kept partially opened, hydraulic pressure flowing through the first port 142 is exhausted through the second port 144 and a portion of pressurized fluid is transmitted to the pressure chamber 130 through the bypass conduit 148.

The hydraulic pressure flowing into the pressure chamber 130 displaces the spool 140 rightward to obstruct the hydraulic pressure flowing out through the second port 144. According to this operation, damper clutch control pressure and lubricant control pressure are controlled.

Hydraulic pressure flowing through the first port 144 is supplied to the first port 150 of the converter clutch regulator valve 12 and flows through the conduits 10a or 10b.

Selection of conduit 10a or 10b is performed according to ON/OFF control of the fifth solenoid valve S5. In a range where the damper clutch is activated, the fifth solenoid valve S5 is controlled to an ON state by the TCU to decrease hydraulic pressure in the pressure chamber 160. Then a portion of the pressurized fluid coming through the first port 150 is transmitted to the pressure chamber 156 located at right side of the spool 164 through the fourth port 158. In this state, hydraulic pressure supplied from the conduit 14 and applied on the pressure face 172 of the second land 174 simultaneously acts against the hydraulic pressure transmitted to the pressure chamber 156. So the spool 164 is displaced leftward in FIG. 2A under the application of hydraulic pressure on the pressure face 166 of the first land 168.

As a result of this displacement of the spool 164, the second land 174 is located at left side of the first port 150 and the first land 168 is located at right side of the third port 154 such that the first port 150 communicates with the third port 154. Thus, hydraulic pressure coming through the first port 150 is transmitted to the torque converter 2 via the conduit 10b to activate the damper clutch.

However, in a range where the damper clutch is not activated, the fifth solenoid valve S5 is controlled to an OFF state by the TCU to increase hydraulic pressure in the pressure chamber 160 which is applied on the pressure face 178 of the fourth land 180.

Even though the hydraulic pressure in the other pressure chamber 156 is also applied on the pressure face 166 of the first land 168, the spool 164 is displaced rightward because the cross section of the pressure face 178 of the fourth land 180 is larger than that of the pressure face 166 of the first land 168.

As a result of this rightward displacement of the spool 164, the second land 174 is located at left side of the third port 154 to obstruct the hydraulic pressure coming through the first port 150, and the second port 152 is partially opened by the third land 176 such that hydraulic pressure coming through the first port 150 is transmitted to the conduit 10a via the second port 152.

Ranges where the damper clutch is activated or deactivated are detected by a sensor which outputs a signal to the TCU. The damper clutch is activated or deactivated by the fifth solenoid valve S5 which is ON-controlled or OFF-controlled by this signal.

These operations are performed at shift stages as explained below.

Figure 3:
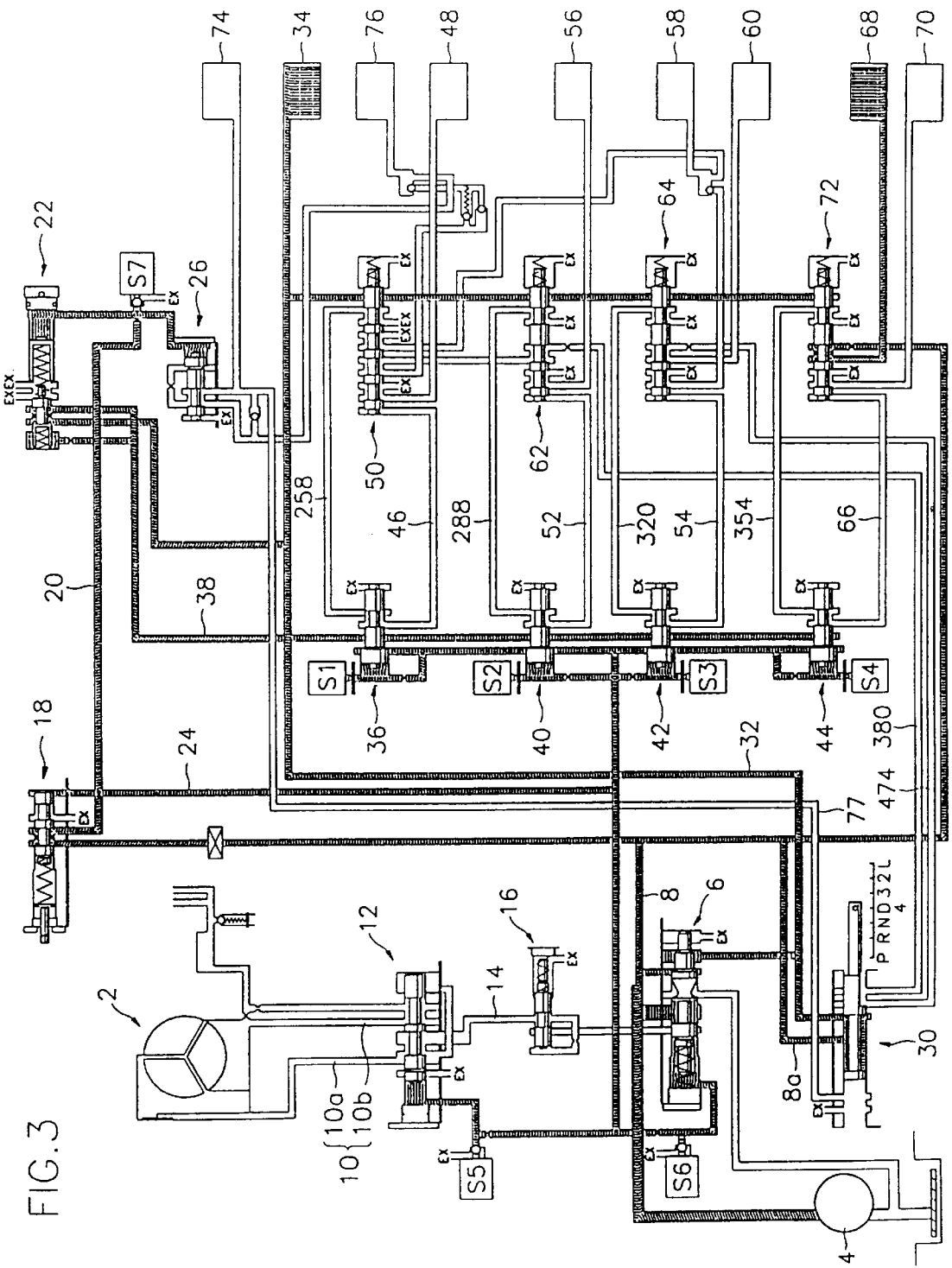
FIG. 3 is the hydraulic control system of FIG. 1 at a first speed of a "D" range.

Referring to FIG. 3 illustrating the hydraulic control system according to the invention at a first speed of "D" the range, a portion of pressurized fluid from the conduit 8 through which the line pressure regulated by the pressure regulating valve 6 flows is used to activate or deactivate the damper clutch, and a remaining portion of the pressurized fluid is supplied to the solenoid supply valve 18 via the first port 186 thereof in the torque pressure conversion section and to the manual valve 30.

Because the first port 186 is partially opened by the third land 198 of the spool 200 which is displaced rightward by the elastic member 202, the line pressure comes in through this first port 186 and flows along the conduit 20 via the second port 188.

Hydraulic pressure is transmitted through the third port 192 which communicates with the conduit 20, which increases the hydraulic pressure within the pressure chamber 190. If the hydraulic pressure applied on the first land 194 overcomes the elastic force biasing the spool 200, the spool 200 is displaced leftward in FIG. 2B such that the second land 196 is displaced between the first port 186 and the second port 188 to obstruct fluid flow.

Hydraulic pressure, which has passed through the solenoid supply valve 18, is supplied to the torque converter regulator valve 22 and the second-to-third and the third-to-fourth shift valves 40 and 42 via the conduit 20 and via the control conduit 24 and then to the first-to-second and fourth-to-fifth shift valves 36 and 44. As the seventh solenoid valve S7 is maintained in an OFF state, the hydraulic pressure supplied to the torque converter regulator valve 22 is exerted on the pressure chamber 220. Accordingly, the torque pressure passes through the torque converter regulator valve 22 to every shift valve 36, 40, 42 and 44 and remains there.

Because the first, second, third and fourth solenoid valves S1, S2, S3 and S4 are controlled to the ON state by the TCU, hydraulic pressure supplied to the second-to-third and third-to-fourth shift valves 40 and 42 via the control conduit 24 do not activate the first-to-second, second-to-third, third-to-fourth and fourth-to-fifth shift valves 36, 40, 42 and 44.

Simultaneously, hydraulic pressure flowing through the conduit 8a is transmitted to the manual valve 30 and the overdrive unit valve 72. The hydraulic pressure transmitted to the manual valve 30 is supplied to a forward clutch and activates the first friction element 34 via the drive pressure conduit 32. The hydraulic pressure flowing through the conduit 32 is supplied to each valve 50, 62, 64 and 72 and remains there (See FIG. 3).

Thus, the first speed of forward driving is performed with the first friction element 34 activated.

As the vehicle speed and the opening degree of the throttle position are increased at the first speed, the TCU controls the sixth solenoid valve S6 and the first solenoid valve S1 among the first, second, third and fourth solenoid valves S1, S2, S3 and S4 which were changed from the OFF state to the ON state and, simultaneously, the TCU controls the seventh solenoid valve S7 to the ON state initially and then gradually to the OFF state.

Figure 4:
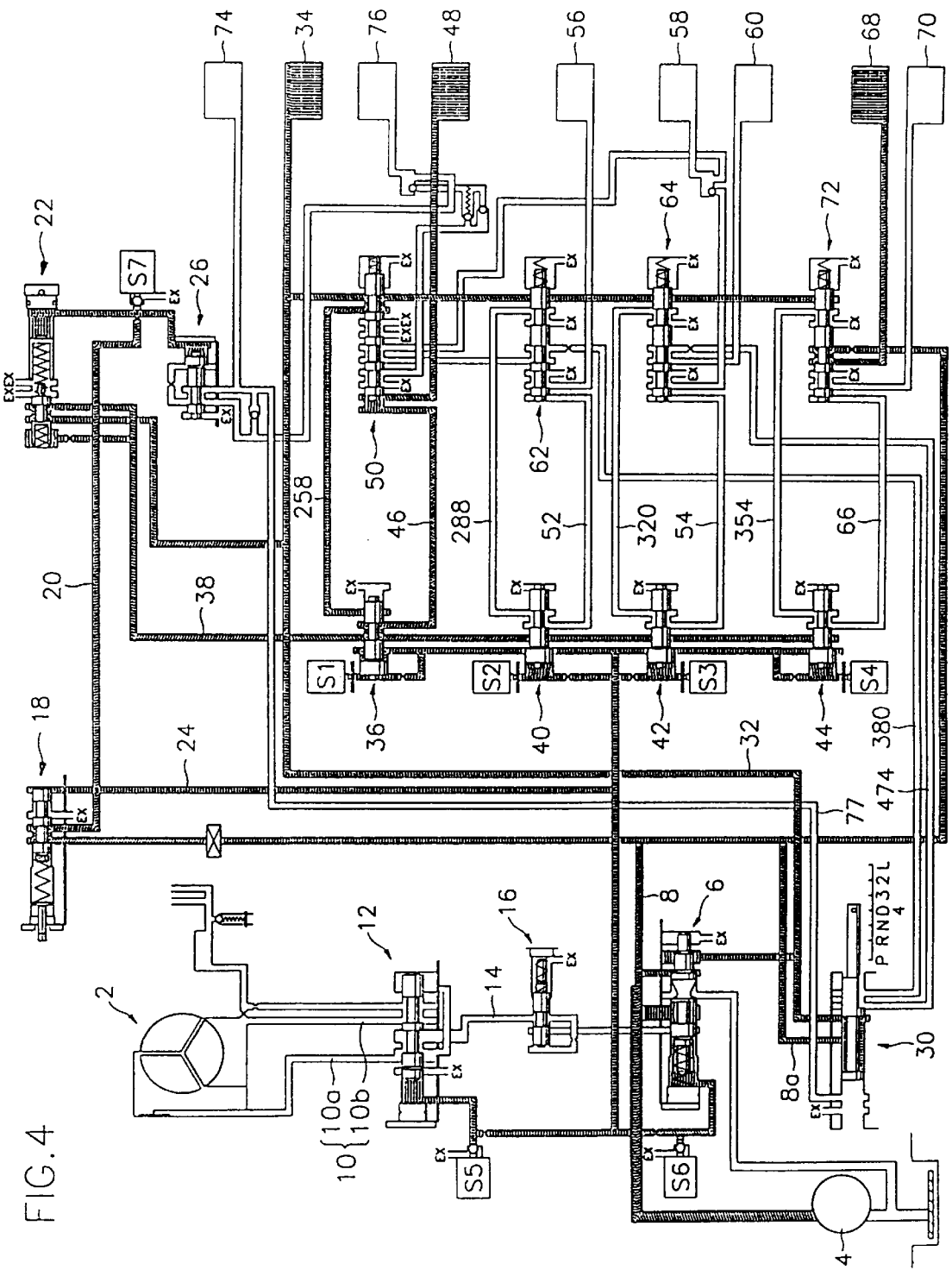
FIG. 4 is the hydraulic control system of FIG. 1 at a first-to-second speed shifting of the "D" range.

Then, hydraulic pressure which is supplied through the conduit 20 as shown in FIG. 4 is supplied to the pressure chamber 220 (See FIG. 2B) of the torque control regulator valve 22. This hydraulic pressure overcomes the elastic forces exerted by the elastic members 244 and 242 one by one and displaces the spool 232 leftward such that the second and third ports 224 and 226 communicate with each other and, thus, the hydraulic pressure supplied to the drive pressure conduit 32 is transmitted to each shift valves 36, 40, 42 and 44 through the conduit 38.

Simultaneously, as the first solenoid valve S1 is controlled to the ON state by the TCU, the hydraulic pressure in the pressure chamber 270 of the first-to-second shift valve 36 (See FIG. 2C) is decreased and the spool 268 is displaced leftward so that the third, fifth and sixth ports 256, 264 and 266 communicate with each other. Torque pressure flowing through the torque pressure conduit 38 flows through the conduits 262 and 46 branched from the conduit 38. Hydraulic pressure flowing through the conduit 262 stays at the third port of the second-to-third shift valve 40. Hydraulic pressure flowing through the conduit 46 is supplied to the pressure chamber 396 of the second clutch valve 50 which displaces the spool 400 rightward in FIG. 2A.

As torque pressure applied on the spool 400 overcomes the elastic force from the elastic member 418 and thus pushes the spool 400 rightward, the first port 370 and the third port 378 communicate with each other and the hydraulic pressure activates the second friction element 48.

Because the second port 374 communicates with the eighth and seventh ports 395 and 394 according to the operation of the second clutch valve 50, hydraulic pressure supplied via the conduit 372 branched from the drive pressure conduit 32 through the conduits 44 and 392 stays at the fourth port 260 of the first-to-second shift valve 50 and the second port 446 of the third clutch valve 62.

Thus, at the first-to-second speed shifting, the sixth and second friction elements 68 and 48 together with the first friction element 34, which was activated at the first speed, activate to perform speed shifting (See FIG. 4).

When the first-to-second speed shifting is completed by the torque pressure, the first solenoid valve S1 which was controlled to the ON state by the TCU is controlled to the OFF state.

Then, when the first and second friction elements 34 and 48 are activated, control pressure is supplied to the pressure chamber 270 of the first-to-second shift valve 36 to displace the spool 268 rightward. The third port 256, through which torque pressure was supplied, is obstructed. Simultaneously, the fourth port 260, at which drive pressure stayed, communicates with the sixth port 266. As a result, drive pressure activates the second friction element 48 through the conduit 36 and the second clutch valve 50.

Figure 5:
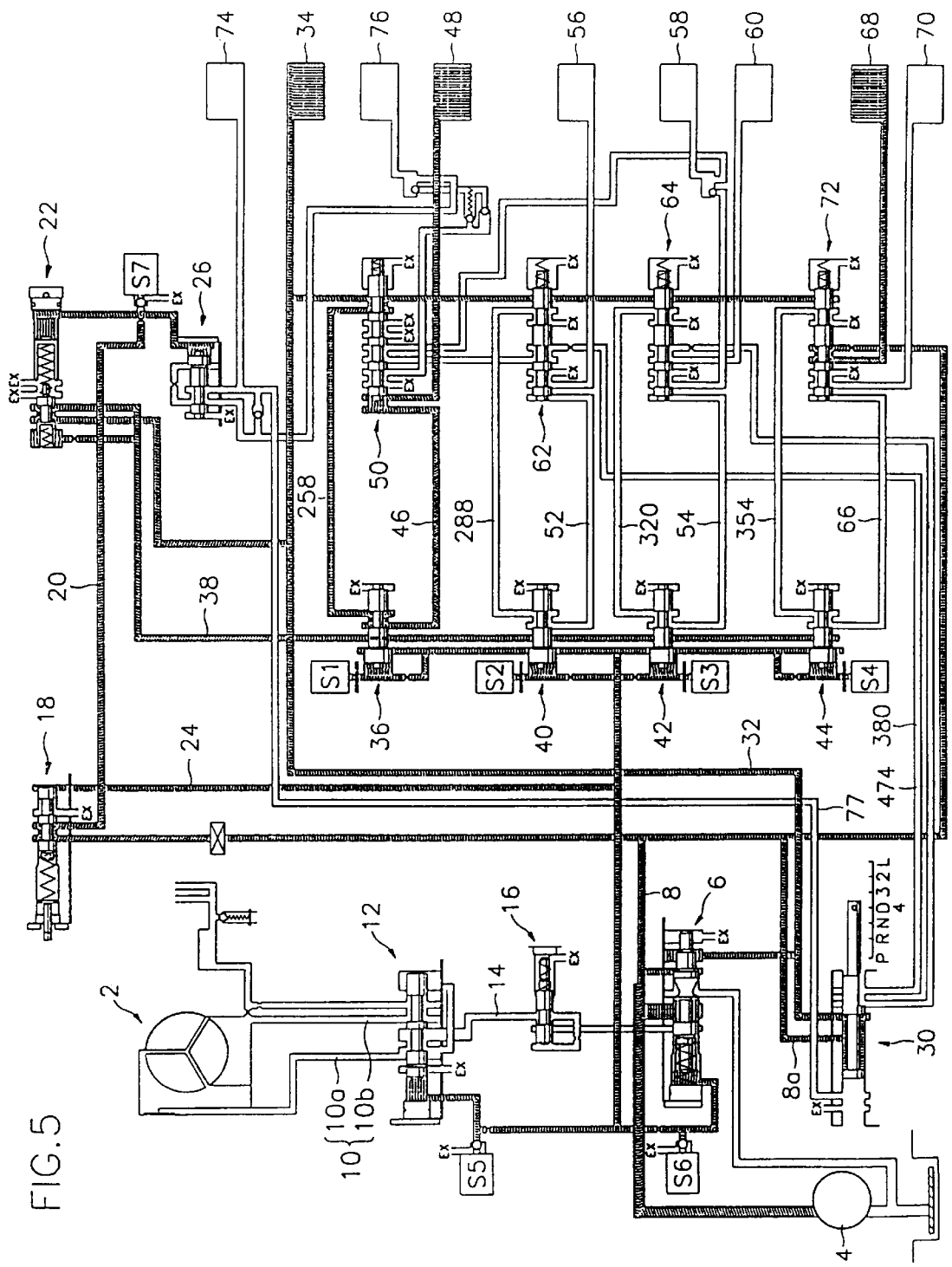
FIG. 5 is the hydraulic control system of FIG. 1 at a second speed of the "D" range.

In sum, the second friction element 48 is activated by drive pressure instead of the torque pressure (See FIG. 5).

As the vehicle speed and the opening degree of the throttle position are increased at the second speed, the TCU controls the second solenoid valve S2 among the first, second, third and fourth solenoid valves S1, S2, S3 and S4 to the ON state. Simultaneously, the TCU controls the seventh solenoid valve S7 to the ON state once and then gradually to the OFF state in order to decrease torque pressure.

Then, when the first, second and sixth friction elements 34, 48 and 68 are activated, as they were in the second speed, the hydraulic pressure supplied to the pressure chamber 300 of the second-to-third shift valve 40 exhausts according to the ON operation of the second solenoid valve S2 to displace which displaces the spool 304 slightly leftward.

Simultaneously, the first port 224 and the second port 226 of the torque control regulator valve 22 communicate with each other according to the OFF operation of the seventh solenoid valve S7, and the torque pressure is supplied along the conduit 38. Even though the spool 268 of the first-to-second shift valve 36 is displaced rightward according to the OFF operation of the first solenoid valve S1, the control pressure supplied to the second-to-third shift valve 40 exhausts according to the ON operation of the second solenoid valve S2 when hydraulic pressure applied to the first-to-second shift valve 36 is weak. Thus, torque pressure supplied through the third port 256 displaces the spool 268 leftward to obstruct the fourth port 260 through which drive pressure was supplied and make the third port 256, through which torque pressure was supplied, communicate with the fifth and sixth ports 264 and 266.

Then, the torque pressure is supplied through the sixth port 266 to maintain the activated state of the second friction element 48 which was activated by the drive pressure. Further, as the spool 304 remains leftward under the operation of the second-to-third shift valve 40, the torque pressure, which has passed through the fifth port 264, flows through the third port 318, the fifth and sixth ports 292 and 296, and the conduits 294 and 52.

Also, as the spool 336 of the third-to-fourth shift valve 42 is displaced rightward by the third solenoid valve S3, hydraulic pressure flowing through the conduit 294 stays at the third port 318, and hydraulic pressure passing through the conduit 52 goes to the pressure chamber of the third clutch valve 62.

Then the spool 464 of the third clutch valve 62 is displaced rightward by the hydraulic pressure. This hydraulic pressure acts to make the first port 444 communicate with the second port 460, and, thus, the hydraulic pressure supplied to the third friction element 56 through the conduit 458 connected to the second port 464 to activate the third friction element 56 and perform the second-to-third speed shifting at the "D" range.

Figure 6:
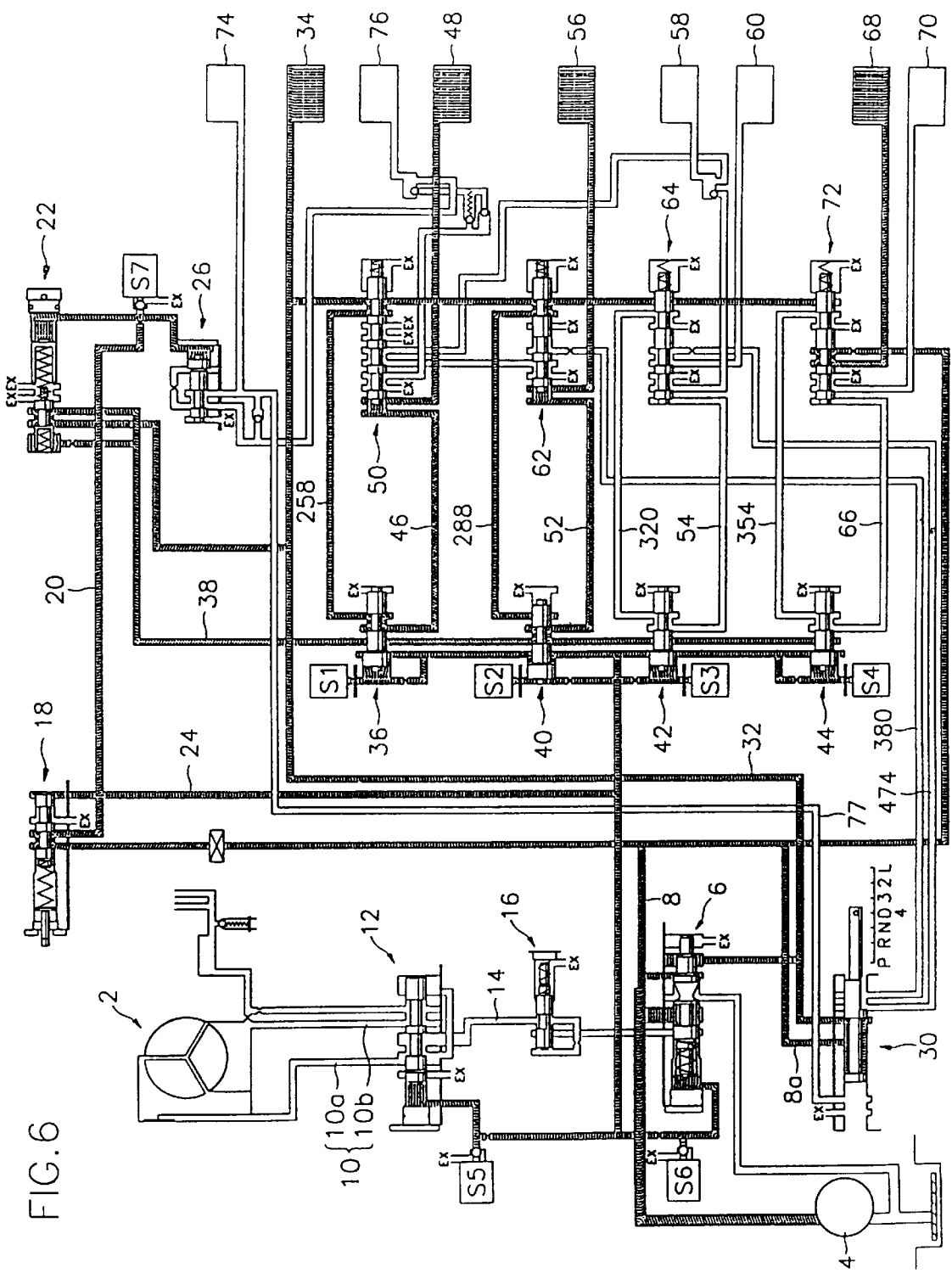
FIG. 6 is the hydraulic control system of FIG. 1 at a second-to-third speed shifting of the "D" range.

Because the second port 446 now communicates with the fifth and sixth ports 454 and 456 by a rightward displacement of the spool 464, the drive pressure supplied through the conduit 392 stays at the fourth port 290 of second-to-third shift valve 40 via the conduit 288, and the hydraulic pressure which has passed through the sixth port 456 stays at the fifth port 490 of the fourth band valve 64. This is a circuit as shown in FIG. 6.

Accordingly, the second-to-third speed shifting of the "D" range is performed with the activated first, second, third and sixth friction elements 34, 48, 56 and 68.

As the second-to-third speed shifting is performed, the TCU controls the second solenoid valve S2 from the ON state to the OFF state and, simultaneously, keeps the seventh solenoid valve S7 on the OFF state.

Then the hydraulic pressure in the pressure chamber 300 of the second-to-third shift valve 40 is increased according to the OFF state control of the second solenoid valve S2, and the spool 304 is displaced rightward. At this state, the third port 286 is obstructed and the fourth port 290, were the drive pressure is, communicate with the sixth port 296. Thus, the drive pressure keeps the third friction element 56 continually activated by the torque pressure.

Because the torque pressure which was supplied to the first-to-second shift valve 36 is obstructed, the force pushing the spool 268 leftward is released. The spool 268 is displaced rightward by the control pressure from the pressure chamber 270 which obstructs the third port 256 and make the fourth port 260 communicate with the sixth port 266 such that the drive pressure activates the second friction element 48.

In sum, the second and seventh solenoid valves S2 and S7 are controlled to make the second and third friction elements 48 and 56 activated by drive pressure instead of by the torque pressure which activated these elements 48 and 56 at the second-to-third speed shifting.

Figure 7:
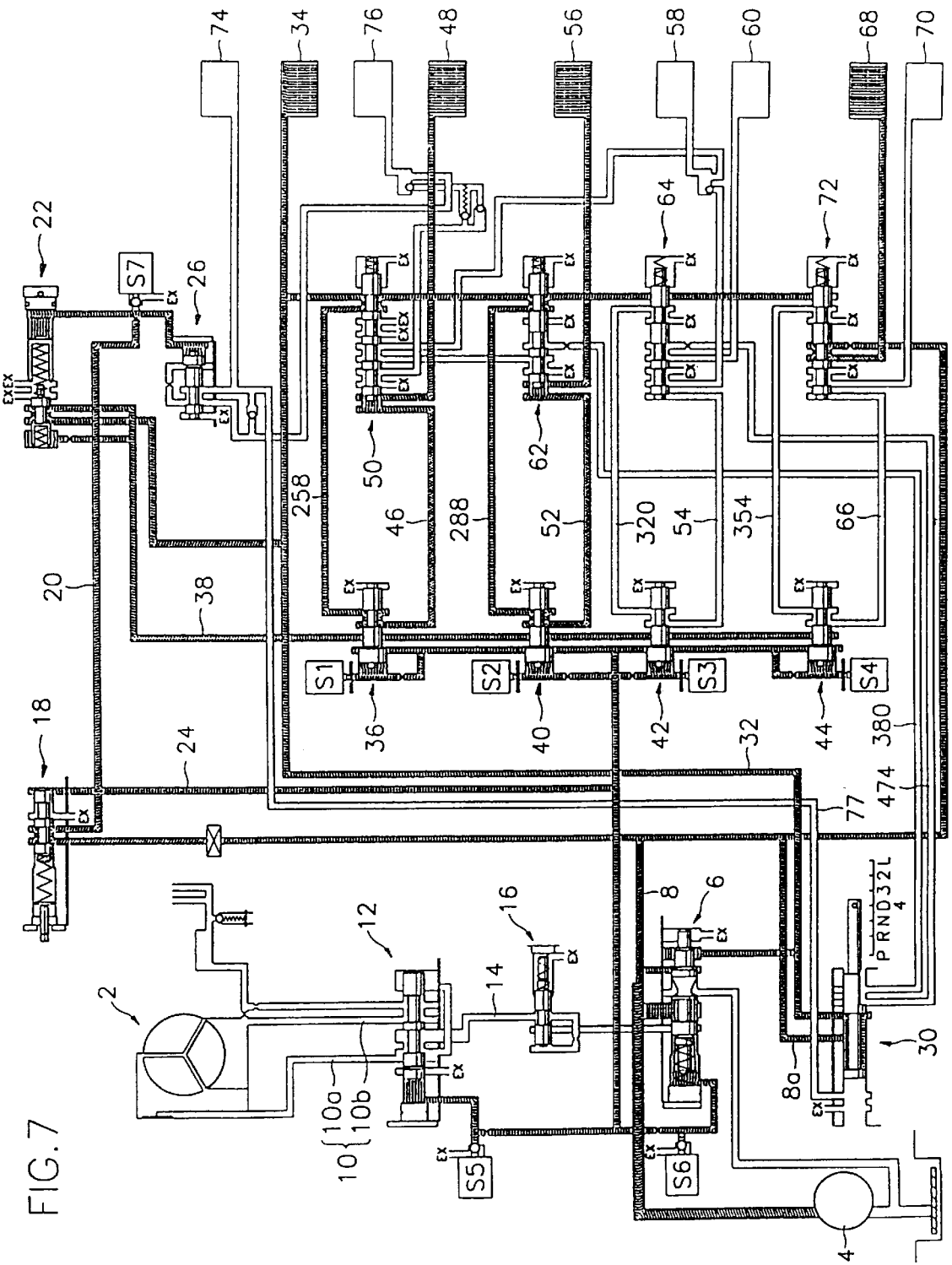
FIG. 7 is the hydraulic control system of FIG. 1 at a third speed of the "D" range.

Thus, the third speed is performed with the activated first, second, third and sixth friction elements 34, 48, 56 and 68 (See FIG. 7).

As the vehicle speed and the opening degree of the throttle position are increased at the third speed, the TCU controls the third solenoid valve S3 to the ON state and, simultaneously, controls the seventh solenoid valve S7 to the ON state once and then to the OFF state gradually to decrease the torque pressure gradually.

Then, when the first, second, third and sixth friction elements 34, 48, 56 and 68 are activated as they were in the third speed, the torque pressure from the torque control regulator valve 22 acts through conduit 38, and, simultaneously, the hydraulic pressure in the pressure chamber 334 of the third-to-fourth shift valve 42 is decreased according to the ON state control of the third solenoid valve S3 which displaces the spool 336 leftward.

Simultaneously, the first and second ports 224 and 226 of the torque control regulator valve 22 communicates with each other according to the OFF control of the seventh solenoid valve S7, and the torque pressure is supplied along the conduit 38 through the first-to-second and second-to-third shift valves 36 and 40 to the third-to-fourth and fourth-to-fifth shift valves 42 and 44. When the spool 336 of the third-to-fourth shift valve 42 is displaced leftward according to the ON state operation of the third solenoid valve S3, the torque pressure is transmitted to the third port 318 and, thus, hydraulic pressure is supplied through the fifth and sixth ports 326 and 328 which communicate with the third port 318. The torque pressure passed through the fifth port 326 is transmitted to the third port 352 of the fourth-to-fifth shift valve 44, and the hydraulic pressure passed through the sixth port 328 is supplied to the pressure chamber 476 through the conduit 54 and the first port 478 of the fourth band valve 64.

Thus the spool 500 is displaced rightward by the hydraulic pressure supplied to the pressure chamber 476 to make the first port 478 communicate with the fourth port 488. Thus, the hydraulic pressure is supplied to the fourth friction element 58 through the conduit 486 connected to the fourth port 488 and activates the fourth friction element 58 to perform the third-to-fourth speed shifting at the "D" range.

Figure 8:
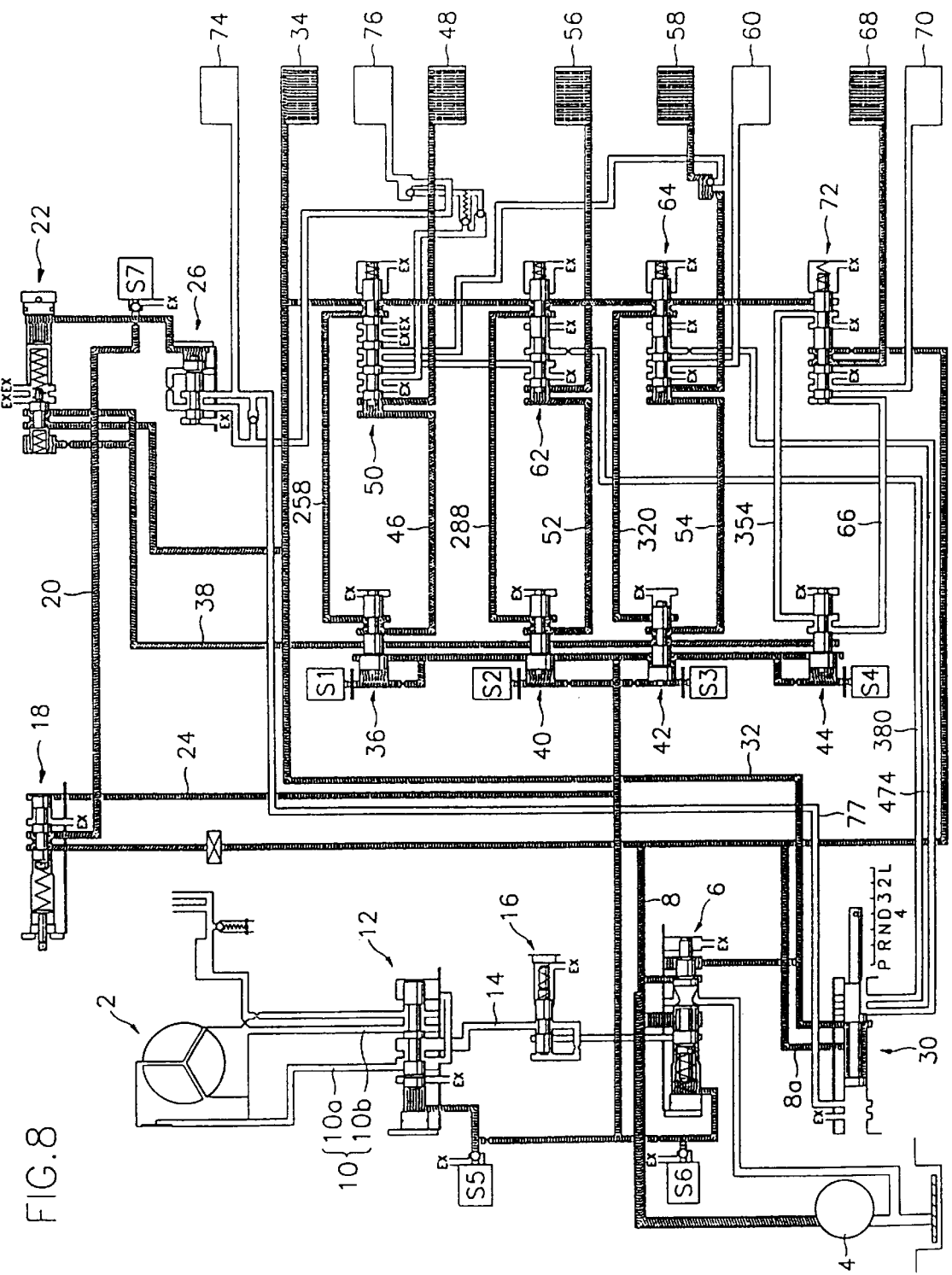
FIG. 8 is the hydraulic control system of FIG. 1 at a third-to-fourth speed shifting of the "D" range.

Also, because the fifth port 490 communicates with the sixth and seventh ports 494 and 496 because of the rightward displacement of the spool 500, the drive pressure supplied through the conduit 452 remains at the fourth port 322 of the third-to-fourth shift valve 42, and the hydraulic pressure passed through the seventh port 496 remains at the fifth port 526 of the over-drive unit valve 72 (See FIG. 8).

Accordingly, the third-to-fourth speed shifting of the "D" range is performed with the activated first, second, third, fourth and sixth friction elements 34, 48, 56, 58 and 68.

As the third-to-fourth speed shifting is performed, the TCU controls the third solenoid valve S3 to the OFF state and, simultaneously, keeps the seventh solenoid valve S7 on the OFF state. Thus, the hydraulic pressure is supplied to the pressure chamber 334 of the third-to-fourth shift valve 42 to displace the spool 336 rightward and obstruct the torque pressure.

Then the third port 318 becomes obstructed and the fourth port 332, to which drive pressure was supplied, communicates with the sixth port 328 to supply the drive pressure to activate the fourth friction element 58.

Figure 9:
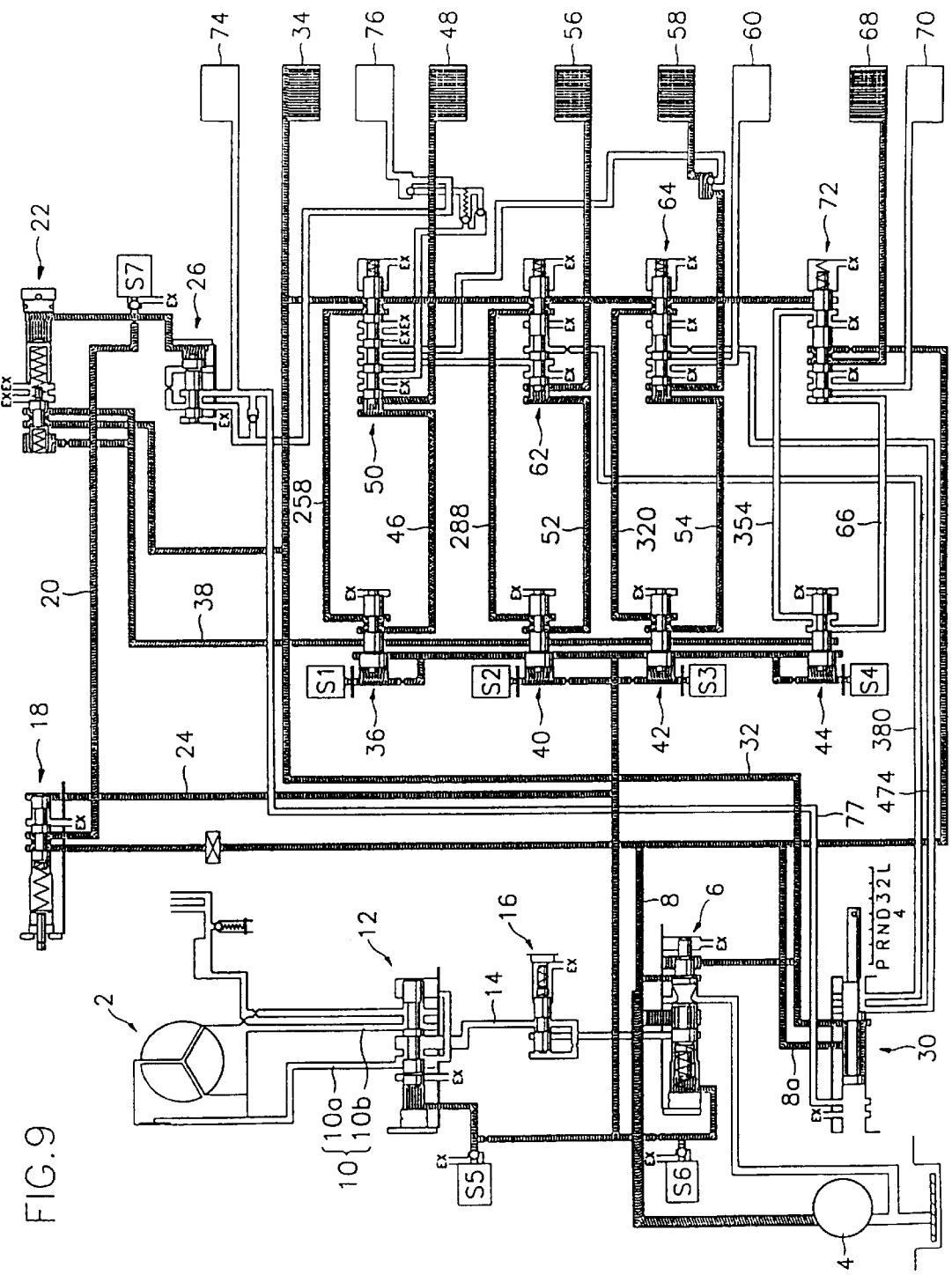
FIG. 9 is the hydraulic control system of FIG. 1 at a fourth speed of the "D" range.

Thus, the fourth speed is performed with the activated first, second, third, fourth and sixth friction elements 34, 48, 56, 58 and 68 (See FIG. 9).

As the vehicle speed and the opening degree of the throttle position are increased at the fourth speed, the TCU controls the fourth solenoid valve S4 to the ON state and, simultaneously, controls the seventh solenoid valve S7 to the ON state once and then gradually to the OFF state to increase torque pressure gradually.

Then, when the first, second, third, fourth and sixth friction elements 34, 48, 56, 58 and 68 are activated as in the fourth speed, the hydraulic pressure in the pressure chamber 360 of the fourth-to-fifth shift valve 44 is decreased according to the ON state control of the fourth solenoid valve S4 to displace the spool 362 leftward.

Simultaneously, the torque pressure supplied from the torque control regulator valve 22 via the conduit 38 is supplied through the first-to-second, second-to-third and third-to-fourth shift valves 36, 40 and 42 via the conduit 324 to the third port 352 of the fourth-to-fifth shift valve 44.

Then, because the torque pressure is transmitted to the third port 352 of the fourth-to-fifth shift valve 44 in a state where the spool 362 is displaced leftward, the hydraulic pressure is supplied through the fifth port 358 which communicates with the third port 352 to the conduit 66 and then to the pressure chamber 512 of the over-drive unit valve 72 through the first port 514.

The hydraulic pressure supplied to the pressure chamber 512, displaces the spool 530 rightward to obstruct the second port 516 through which hydraulic pressure from the conduit 8a was supplied and deactivates the sixth friction element 68. Also, the first port 514 communicates with the fourth port 524 such that hydraulic pressure is supplied via the conduit 522 which connects to the fourth port 524 to the seventh friction element 70 to activate the same and, thus, perform the fourth-to-fifth speed shifting at the "D" range.

Figure 10:
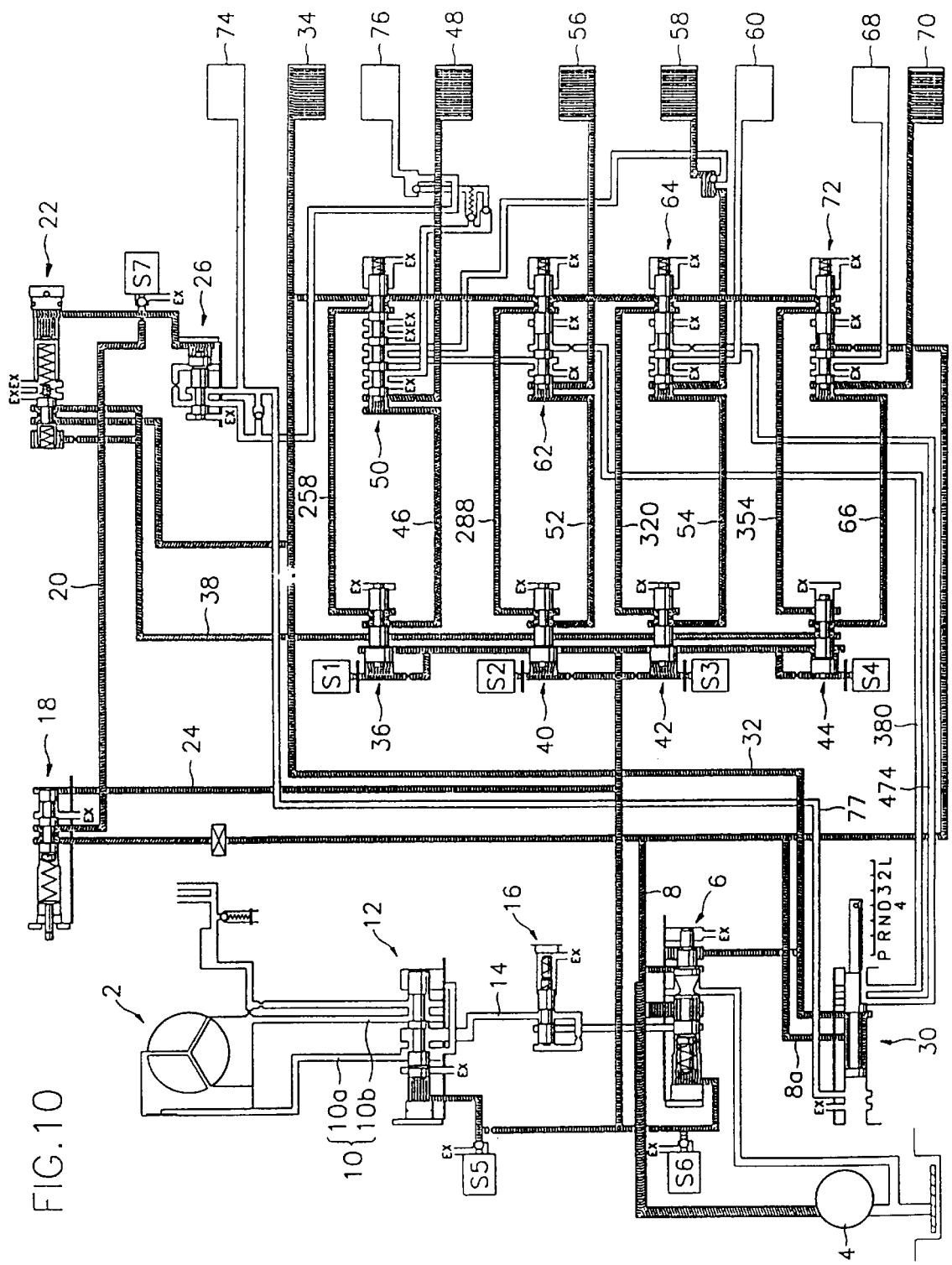
FIG. 10 is the hydraulic control system of FIG. 1 at a fourth-to-fifth speed shifting of the "D" range.

Because the fifth port 526 communicates with the sixth port 528 by the rightward displacement of the spool 530, the drive pressure supplied through the conduit 354 stays at the fourth port 356 of the fourth-to-fifth shift valve 44 (See FIG. 10).

Accordingly, the fourth-to-fifth speed shifting at the "D" range is performed with the activated first, second, third, fourth and seventh friction elements 34, 48, 56, 58 and 70.

As the fourth-to-fifth speed shifting is performed, the TCU controls the fourth solenoid valve S4 to the OFF state to supply hydraulic pressure to the pressure chamber 360 of the fourth-to-fifth shift valve 44 and keeps the seventh solenoid valve S7 to the OFF state.

Then the hydraulic pressure is supplied to the pressure chamber 360 of the fourth-to-fifth shift valve 44 to displace the spool 446 rightward and the obstruct torque pressure and, simultaneously, to make the fourth port 356 to which drive pressure was supplied communicate with the fifth port 358 to activate the second, third, fourth and seventh friction elements 48, 56, 58 and 70.

Figure 11:
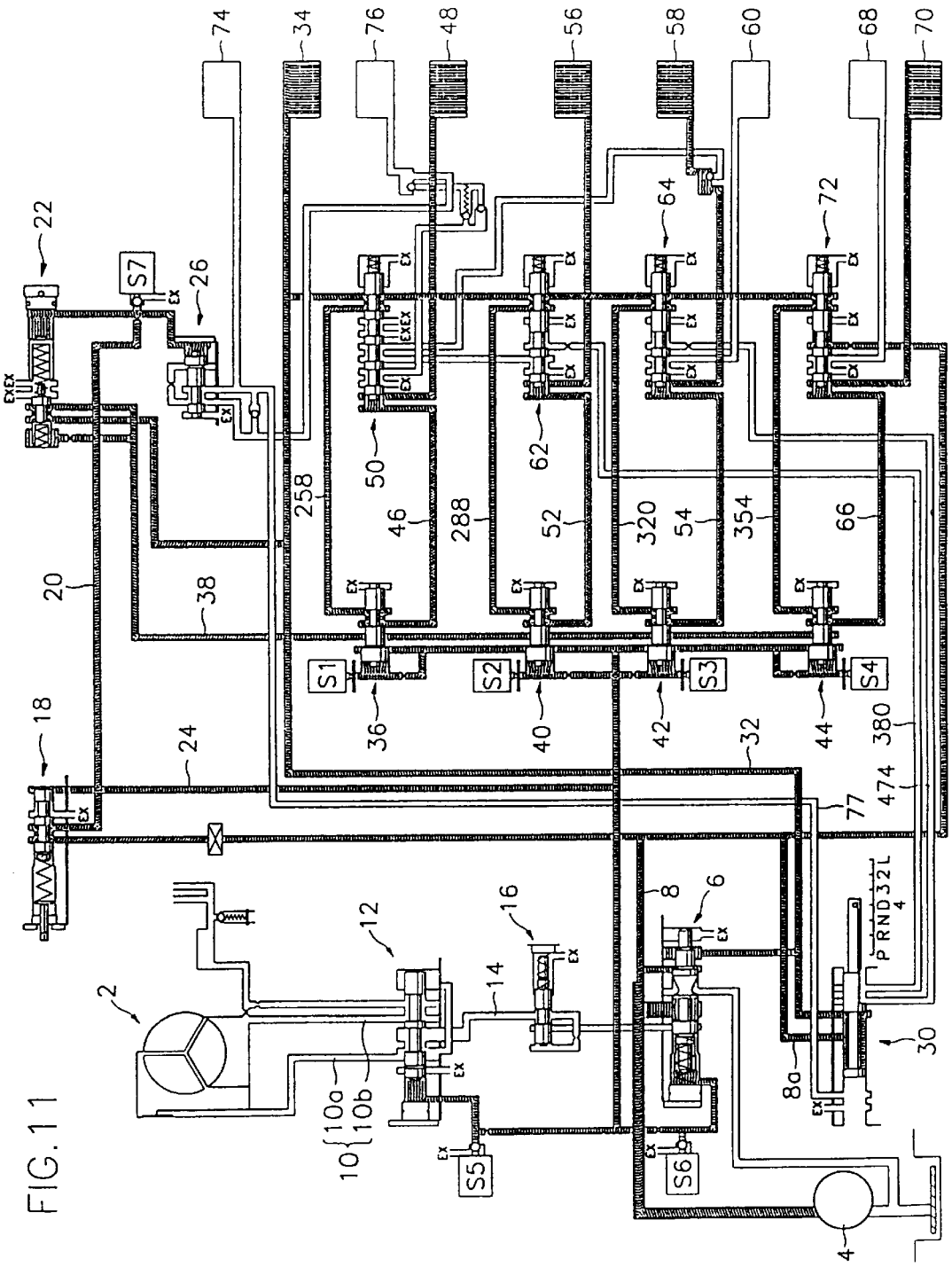
FIG. 11 is the hydraulic control system of FIG. 1 at a fifth speed of the "D" range.

Thus the fifth speed is performed with the activated first, second, third, fourth and seventh friction elements 34, 48, 56, 58 and 70 (See FIG. 11).

Speed shifting processes from the first speed to the fifth speed have been explained above. According to the present embodiment, the friction elements are activated by torque pressure when speed shifting is initiated and then the torque pressure is replaced by the drive pressure to improve responsiveness and make skip shifting possible.

In skip shifting, the speed is not shifted sequentially. The speed is shifted from the first speed to the fifth speed directly or from the first speed to the third speed directly. Skip shifting is explained below.

If an accelerator pedal is pressed abruptly at the third speed, the TCU detects this, controls the sixth solenoid valve S6 directly to regulate line pressure, and controls the seventh solenoid valve S7 to decrease once and then to increase torque pressure gradually.

Simultaneously, the third and fourth solenoid valves S3 and S4, among those solenoid valves controlled to the OFF state to perform the third speed driving, are controlled to the ON state to exhaust the hydraulic pressure in the pressure chambers 334 and 360 of the third-to-fourth and fourth-to-fifth shift valves 42 and 44.

By this, the hydraulic pressure in the pressure chambers 334 and 360 is decreased, and, as the spools 336 and 362 are displaced leftward, torque pressure is supplied through the fifth and sixth ports 326 and 328 at the third-to-fourth shift valve 42 and torque pressure is also supplied through the fifth port 358 at fourth-to-fifth shift valve 44, and is supplied via the fourth band valve 64 and the over-drive unit valve 72 to activate the fourth and seventh friction elements 58 and 70 to perform the third-to-fifth skip shifting.

Figure 12:
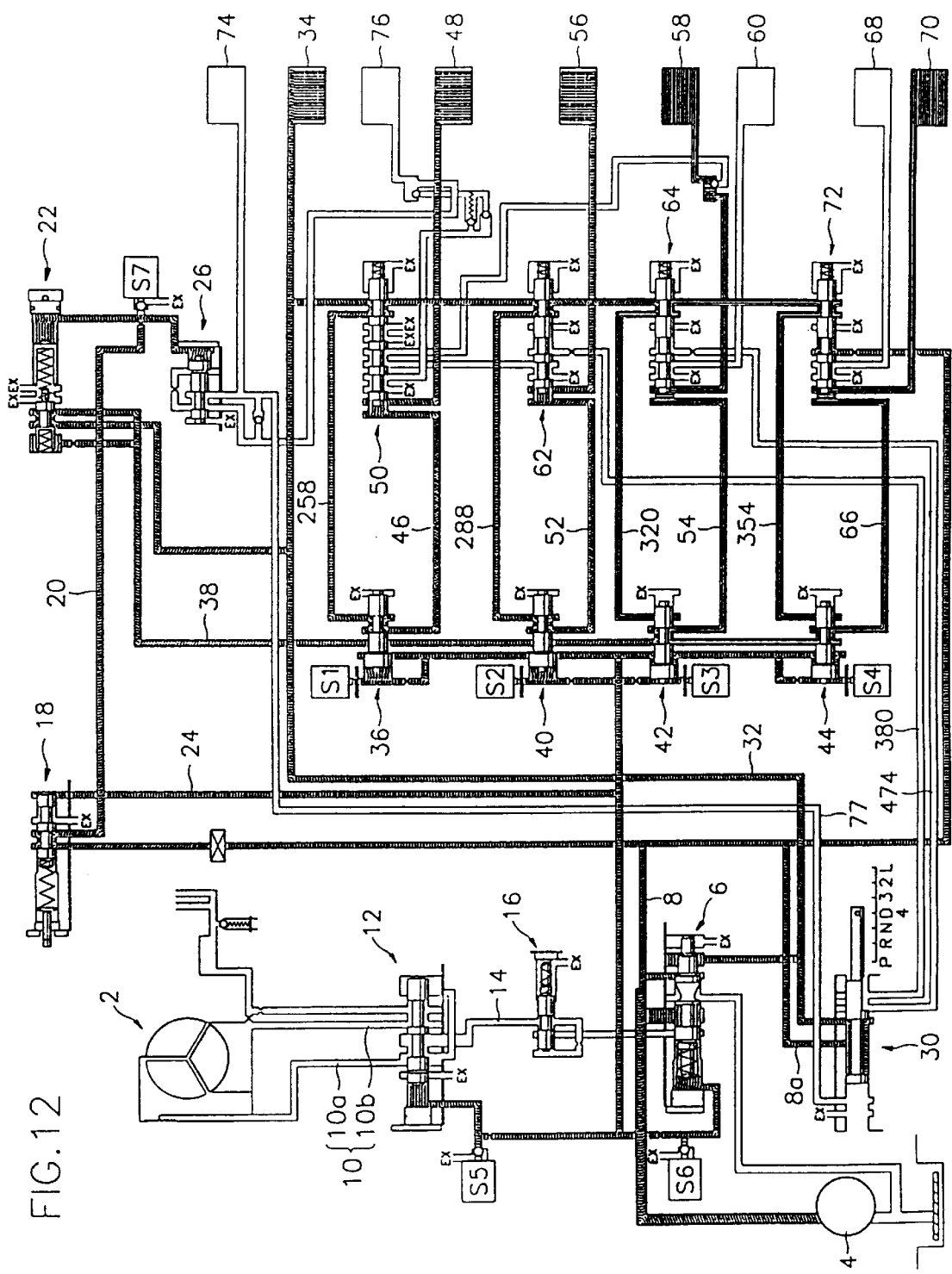
FIG. 12 is the hydraulic control system of FIG. 1 at a third-to-fifth skip shifting of the "D" range.

That is, the sixth friction element 68 is deactivated at the third speed, and the fourth and seventh friction elements 58 and 70, hatched parts in FIG. 12, are activated.

After the third-to-fifth skip shifting is performed, the TCU controls the third and fourth solenoid valves S3 and S4 to the ON state and activates the second, third, fourth and seventh friction elements 48, 56, 58 and 70 by drive pressure instead of torque pressure to establish hydraulic pressure for the fifth speed as shown in FIG. 11 and to allow driving at the fifth speed.

If the accelerator pedal is pressed abruptly at the second speed, the TCU detects this, and then controls the sixth solenoid valve S6 directly to regulate line pressure, and controls the seventh solenoid valve S7 to decrease once and then gradually increase torque pressure.

Simultaneously, the second, third and fourth solenoid valves S2, S3 and S4 which were controlled to the OFF state to perform the second speed driving are controlled to the ON state to exhaust the hydraulic pressure in the pressure chambers 300, 334 and 360 of the second-to-third, third-to-fourth and fourth-to-fifth shift valves 40, 42 and 44.

By this, the hydraulic pressure in the pressure chambers 300, 334 and 360 is decreased, and, as the spools 304, 336 and 362 are displaced leftward torque pressure is supplied through the fifth and sixth ports 326 and 328 at the third-to-fourth shift valve 42 and the fifth port 358 at the fourth-to-fifth shift valve 44, and via the fourth band valve 64 and the over-drive unit valve 72, to activate the fourth and seventh friction elements 58 and 70 to perform the second-to-fifth skip shifting.

Figure 13:
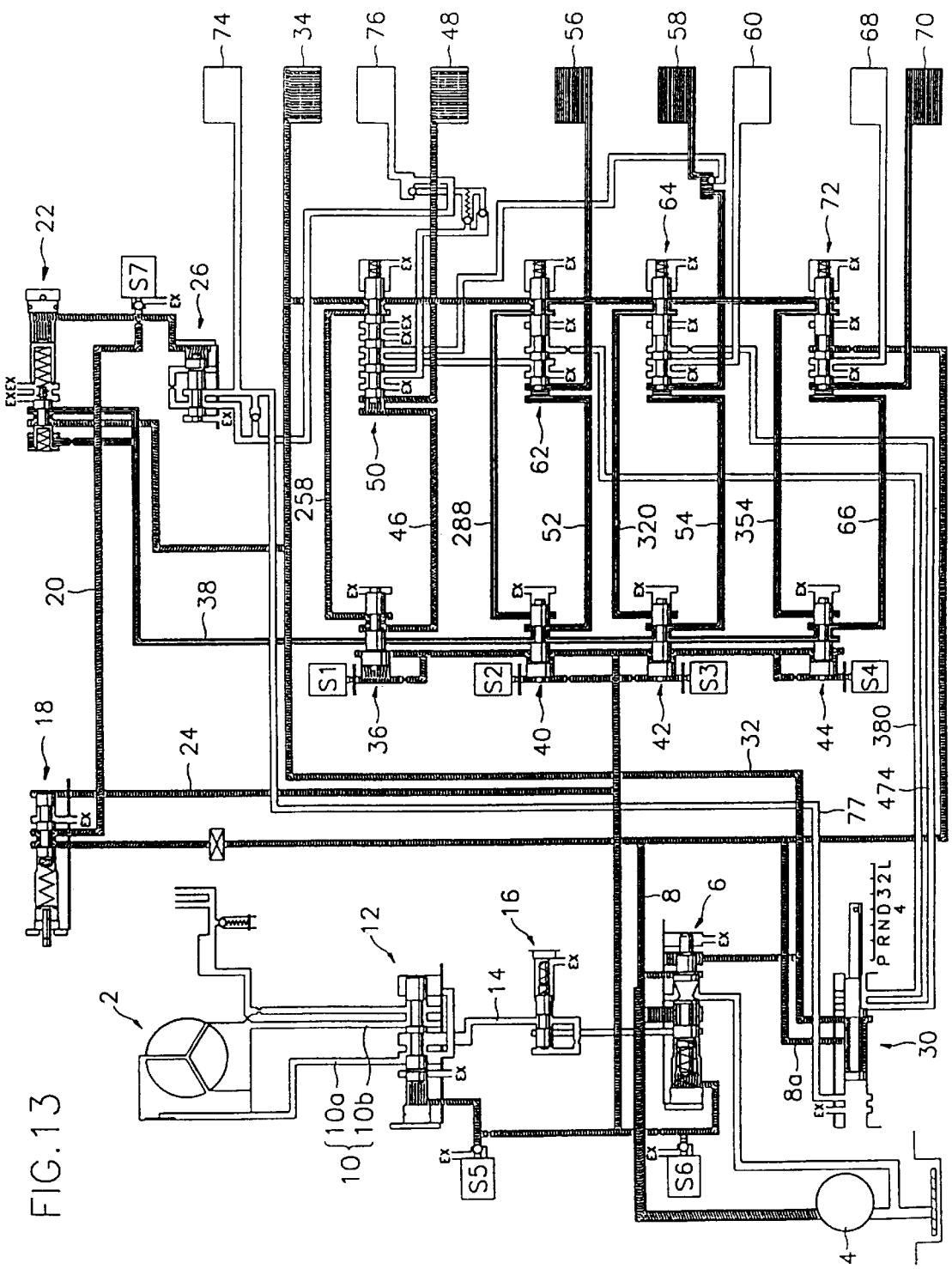
FIG. 13 is the hydraulic control system of FIG. 1 at a second-to-fifth skip shifting.

In sum, the sixth friction element 68 is deactivated at the second speed, and the third, fourth and seventh friction elements 56, 58 and 70, hatched parts in FIG. 13, are activated.

After the second-to-fifth skip shifting is performed, the TCU controls the second, third and fourth solenoid valves S2, S3 and S4 to the ON state and activates the second, third, fourth and seventh friction elements 48, 56, 58 and 70 by drive pressure instead of torque pressure to establish the hydraulic pressure for the fifth speed as shown in FIG. 11 and to allow the driving at the fifth speed.

If the accelerator pedal is pressed abruptly at the second speed, the TCU detects this, controls the sixth solenoid valve S6 directly to regulate line pressure, and controls the seventh solenoid valve S7 to decrease once and then gradually increase torque pressure.

Simultaneously, the second and third solenoid valves S2 and S3 which were controlled to the OFF state to perform the second speed driving are controlled to the ON state to exhaust the hydraulic pressure in the pressure chambers 300 and 334 of the second-to-third and third-to-fourth shift valves 40 and 42.

By this, the hydraulic pressure in the pressure chambers 300 and 334 is decreased, and, as the spools 304 and 336 are displaced leftward, the torque pressure is supplied via the second-to-third and third-to-fourth shift valves 40 and 42 and though the third clutch valve 62 and the fourth band valve 64 to activate the third and fourth friction elements 56 and 58.

Figure 14:
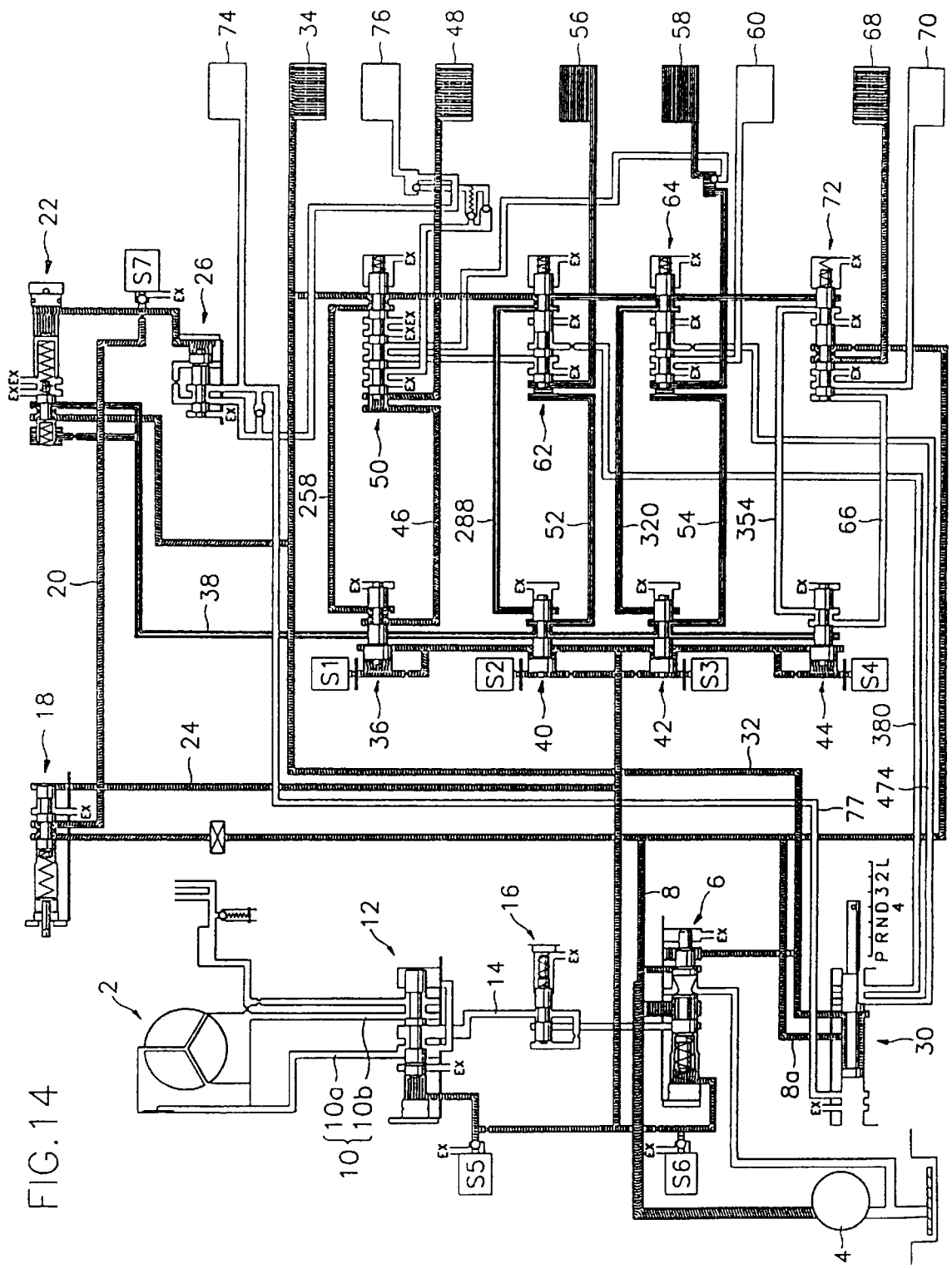
FIG. 14 is the hydraulic control system of FIG. 1 at a second-to-fourth skip shifting.

In sum, the second and sixth friction element 34, 48 and 68 are activated at the second speed, and the third and fourth friction elements 56 and 58, hatched parts in FIG. 14, are activated.

After the second-to-fourth skip shifting is performed, the TCU controls the second and third solenoid valves S2 and S3 to the OFF state and activates the second, third, fourth and sixth friction elements 48, 56, 58 and 68 by drive pressure instead of torque pressure to establish the hydraulic pressure for the fourth speed as shown in FIG. 9 and to allow the driving at the fourth speed.

If the accelerator pedal is pressed abruptly at the first speed, the TCU detects this, controls the sixth solenoid valve S6 directly to regulate line pressure, and controls the seventh solenoid valve S7 to increase once and then gradually decrease torque pressure.

Simultaneously, the first, second, third and fourth solenoid valves S1, S2, S3 and S4 which were controlled to the OFF state to perform the first speed driving are controlled to the ON states to exhaust hydraulic pressure in the pressure chambers 270, 300, 334 and 360 of the first-to-second, second-to-third, third-to-fourth and fourth-to-fifth shift valves 36, 40, 42 and 44.

By this, the hydraulic pressure in the pressure chambers 270, 330, 334 and 360 is decreased, and the spools 270, 300, 336 and 362 are displaced leftward. Torque pressure supplied through the conduit 38 is supplied via each of the third ports 256, 286, 318 and 352 of the shift valves 36, 40, 42 and 44 to each of the fifth ports 264, 292 and 326 and each of the sixth ports 266, 296, 328 and 358 to activate the second, third, fourth and seventh friction elements 34, 48, 56 and 70 and to perform the first-to-fifth skip shifting.

Figure 15:
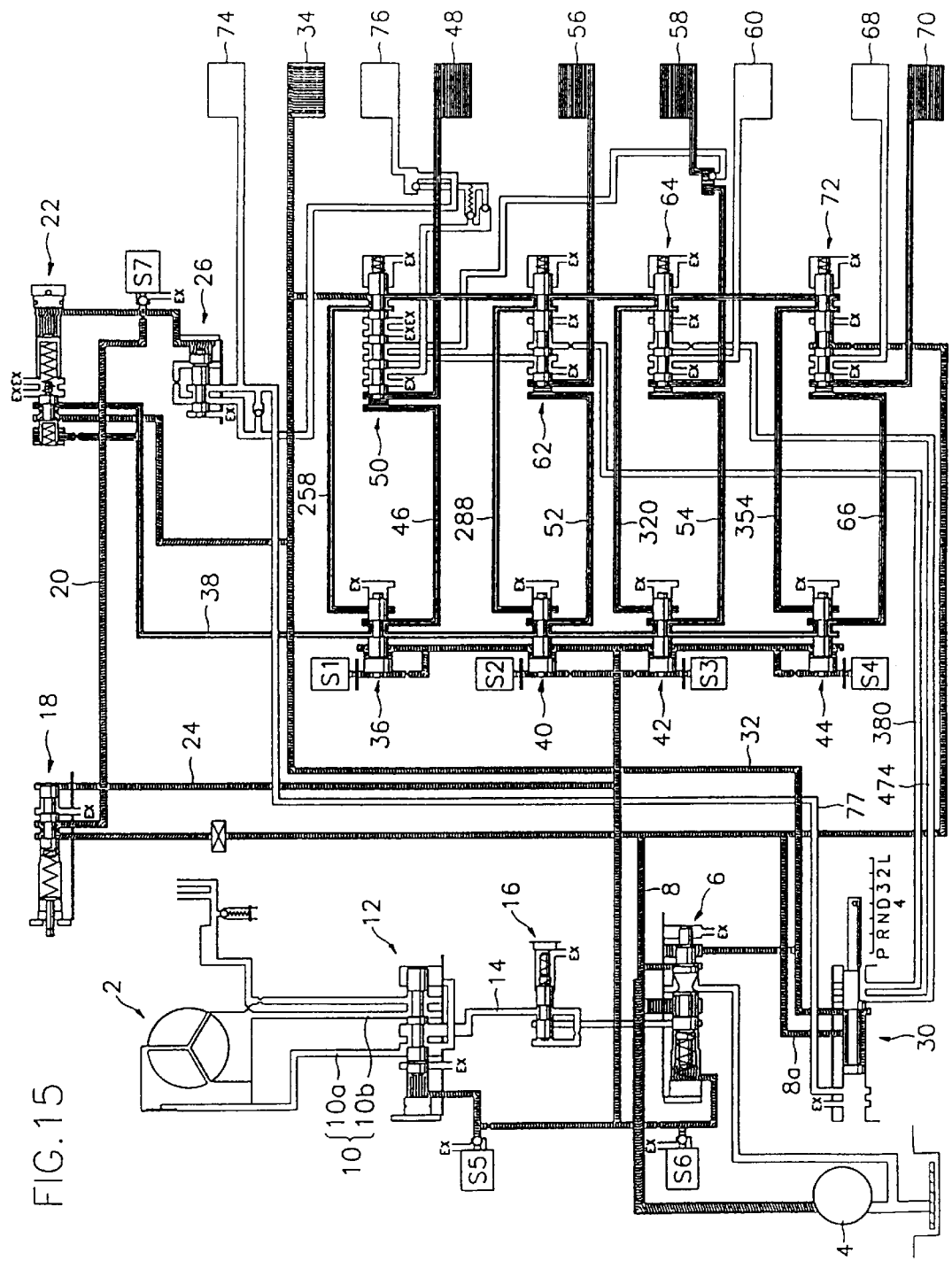
FIG. 15 is the hydraulic control system of FIG. 1 at a first-to-fifth skip shifting.

In sum, the sixth friction element 68 is deactivated at the first speed, and the second, third, fourth and seventh friction elements 48, 56, 58 and 70, hatched parts in FIG. 15, are activated.

After the first-to-fifth skip shifting is performed, the TCU controls the first, second, third and fourth solenoid valves S1, S2, S3 and S4 to the OFF state and activates the second, third, fourth and seventh friction elements 48, 56, 58 and 70 by drive pressure instead of torque pressure to establish the hydraulic pressure for the fifth speed as shown in FIG. 11 and to allow the driving at the fifth speed.

If the accelerator pedal is pressed abruptly at the first speed, the TCU detects this, and then controls the sixth solenoid valve S6 directly to regulate line pressure, and controls the seventh solenoid valve S7 to increase once and then gradually decrease torque pressure.

Simultaneously, the first, second and third solenoid valves S1, S2 and S3 which were controlled to the OFF state to perform the first speed driving are controlled to the ON state to exhaust the hydraulic pressure in the pressure chambers 270, 300 and 334 of the first-to-second, second-to-third and third-to-fourth shift valves 36, 40 and 42.

By this, the hydraulic pressure in the pressure chambers 270, 300 and 334 is decreased, and the spools 268, 304 and 336 are displaced leftward. Simultaneously, while control pressure supplied to the fourth-to-fifth shift valve 44 is weakly transmitted according to the ON state control of the first, second and third solenoid valves S1, S2 and S3, the torque pressure in the conduit 38 is supplied via the third port 256 of the first-to-second shift valve 36. As the spool 268 is displaced leftward, the hydraulic pressure is supplied through the third port 256 and the fifth and sixth ports 264 and 266. The hydraulic pressure supplied to the sixth port 266 activates the second friction element 48, and the hydraulic pressure supplied to the fifth port 264 is supplied to the third port 286 of the second-to-third shift valve 40 to displace the spool 304 leftward.

Leftward displacement of the spool 304 makes the third port 286 communicate with the fifth and sixth ports 292 and 296. Hydraulic pressure supplied to the sixth port 296 activates the third friction element 56, and the hydraulic pressure passed through the fifth port 292 is supplied via the fifth and sixth ports 326 and 328 of the third-to-fourth shift valve 42 and the fourth band valve 64 to activate the fourth friction element 58 and to perform the first-to-fourth skip shifting.

Figure 16:
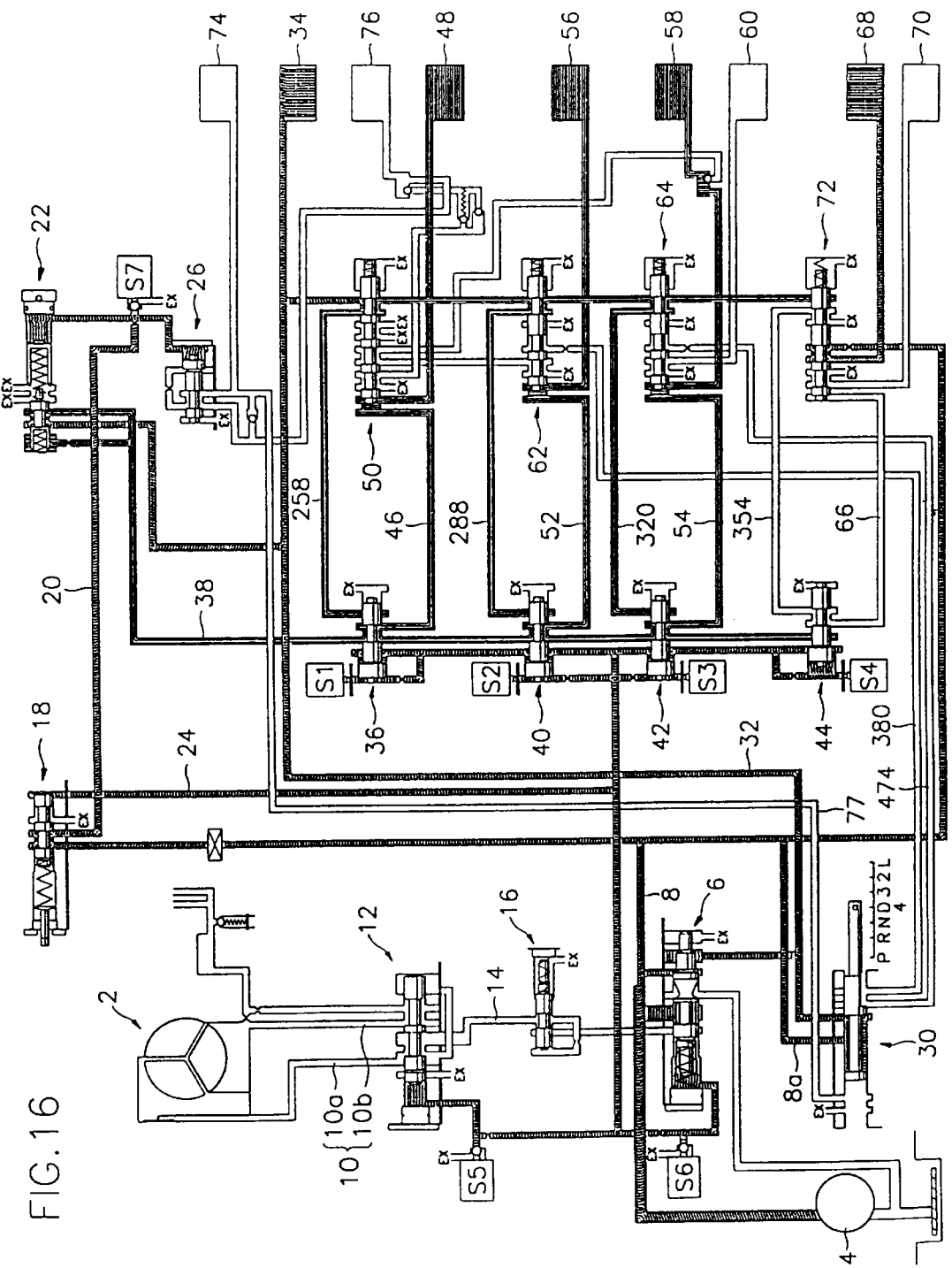
FIG. 16 is the hydraulic control system of FIG. 1 at a first-to-fourth skip shifting.

In sum, the second, third and fourth friction elements 48, 56 and 58, hatched parts in FIG. 16, are also activated at the first speed.

After the first-to-fourth skip shifting is performed, the TCU controls the first, second and third solenoid valves S1, S2 and S3 to the OFF state and activates the second, third and fourth friction elements 48, 56 and 58 by drive pressure instead of the torque pressure to establish the hydraulic pressure for the fourth speed as shown in FIG. 9 and to allow the driving at the fourth speed.

If the accelerator pedal is pressed abruptly at the first speed, the TCU detects this, then controls the sixth solenoid valve S6 directly to regulate line pressure, and controls the seventh solenoid valve S7 to increase once and then gradually decrease torque pressure.

Simultaneously, the first and second solenoid valves S1 and S2, which were controlled to the OFF state to perform the first speed driving, are controlled to the ON state to exhaust the hydraulic pressure in the pressure chambers 270 and 300 of the first-to-second and second-to-third shift valves 36 and 40.

By this, the hydraulic pressure in the pressure chambers 270 and 300 is decreased, and the spools 268 and 304 are displaced leftward to supply torque pressure from the conduit 38 through the third port 256 of the first-to-second shift valve 36. As the spool 268 is displaced leftward, the hydraulic pressure is supplied through the third, fifth and sixth ports 256, 264 and 266 to the sixth port 266 to activate the second friction element 48, and the hydraulic pressure supplied through the fifth port 264 is supplied to the third port 286 of the second-to-third shift valve 40 to displace spool 304 leftward.

Leftward displacement of the spool 304 communicates the third port 286 with the fifth and sixth ports 292 and 296. The hydraulic pressure supplied to the sixth port 296 activates the third friction element 56 to perform the first-to-third skip shifting.

Figure 17:
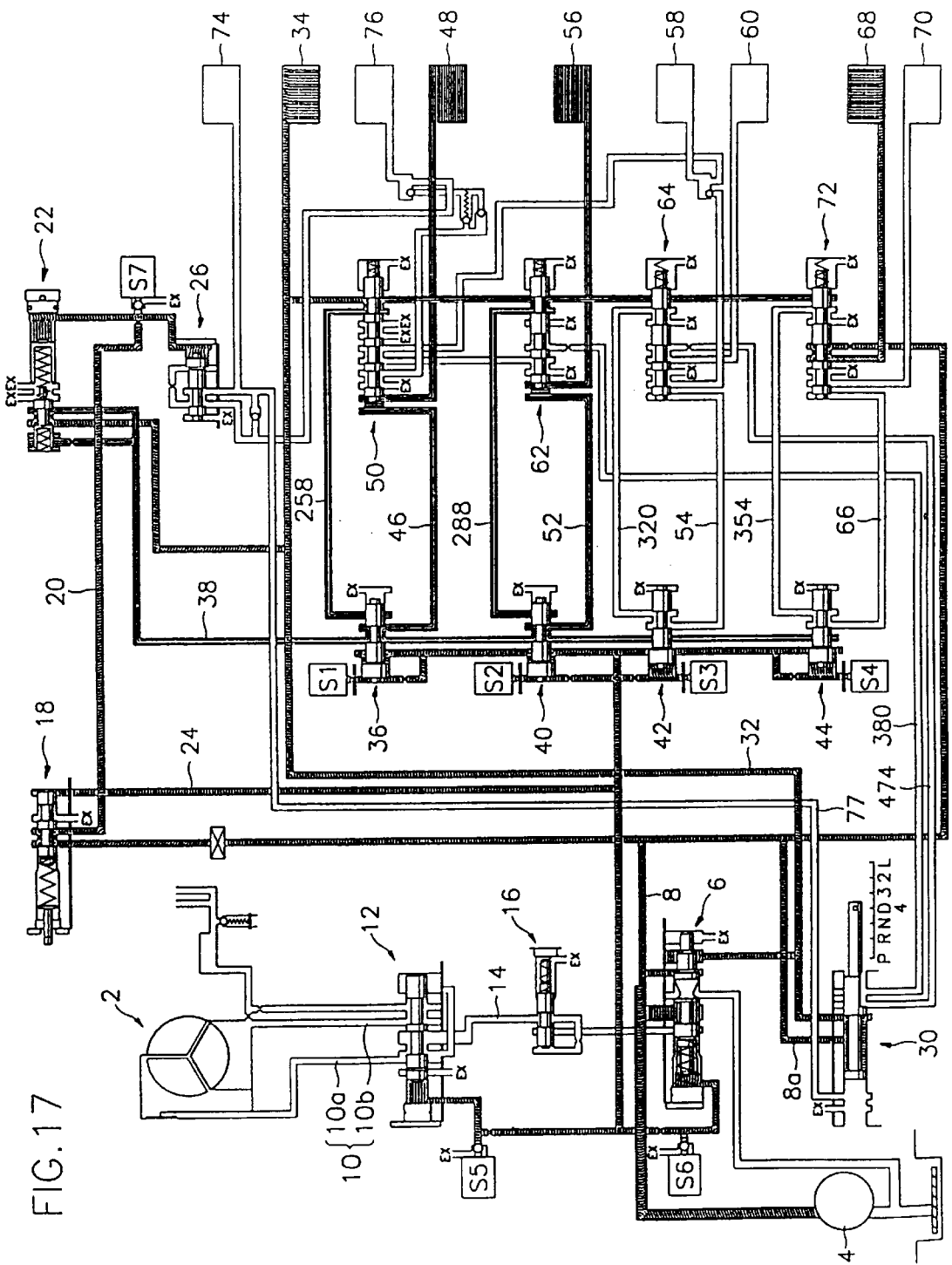
FIG. 17 is the hydraulic control system of FIG. 1 at a first-to-third skip shifting.

In sum, the second and third friction elements 48 and 56, hatched parts in FIG. 17, are also activated at the first speed.

After the first-to-third skip shifting is performed, the TCU controls the first and second solenoid valves S1 and S2 to the OFF state and activates the second and third friction elements 48 and 56 by drive pressure instead of torque pressure to establish the hydraulic pressure for the third speed as shown in FIG. 7 and to allow driving at the third speed.

Figure 18:
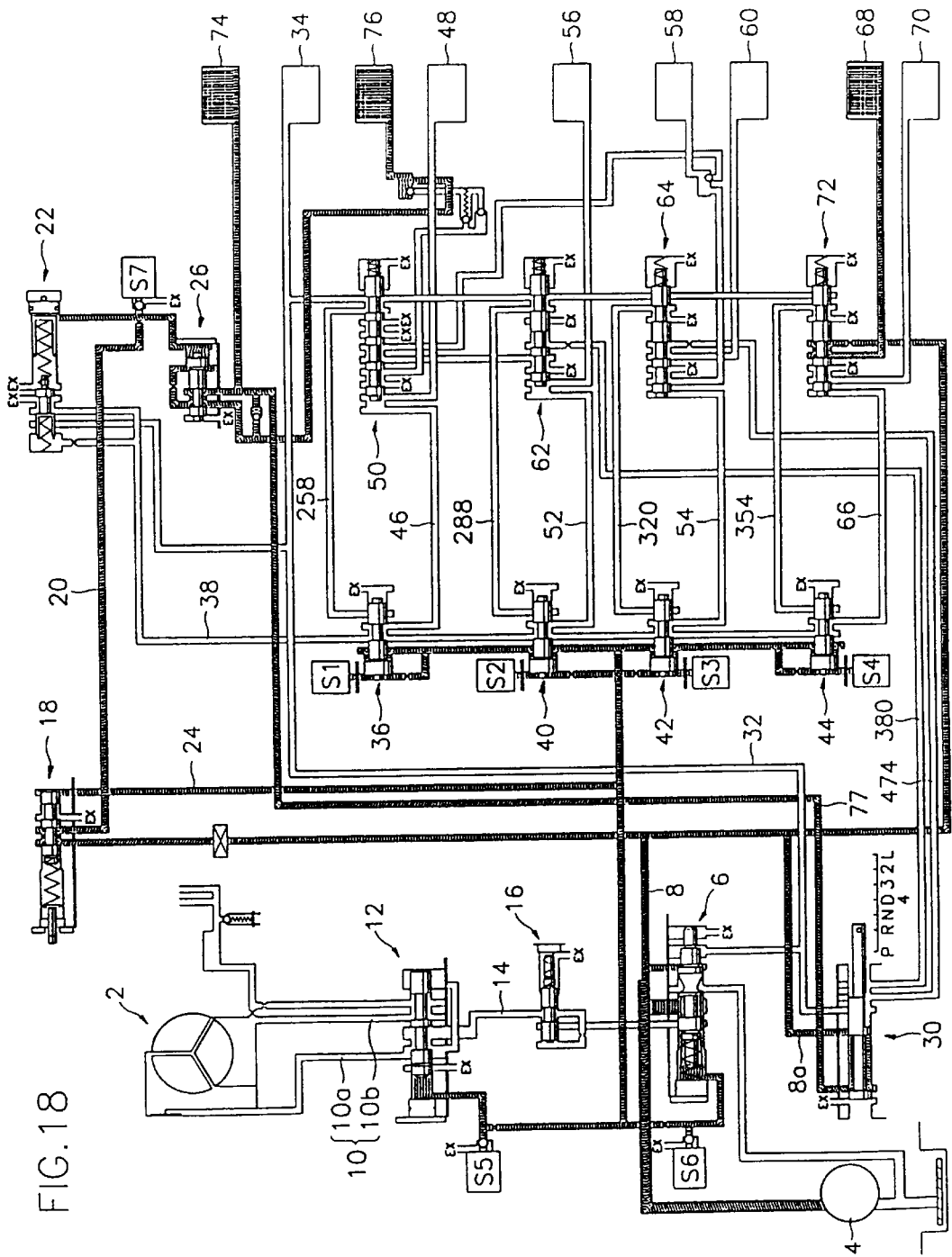
FIG. 18 is the hydraulic control system of FIG. 1 at an "R" (reverse) range.
Figure 19:
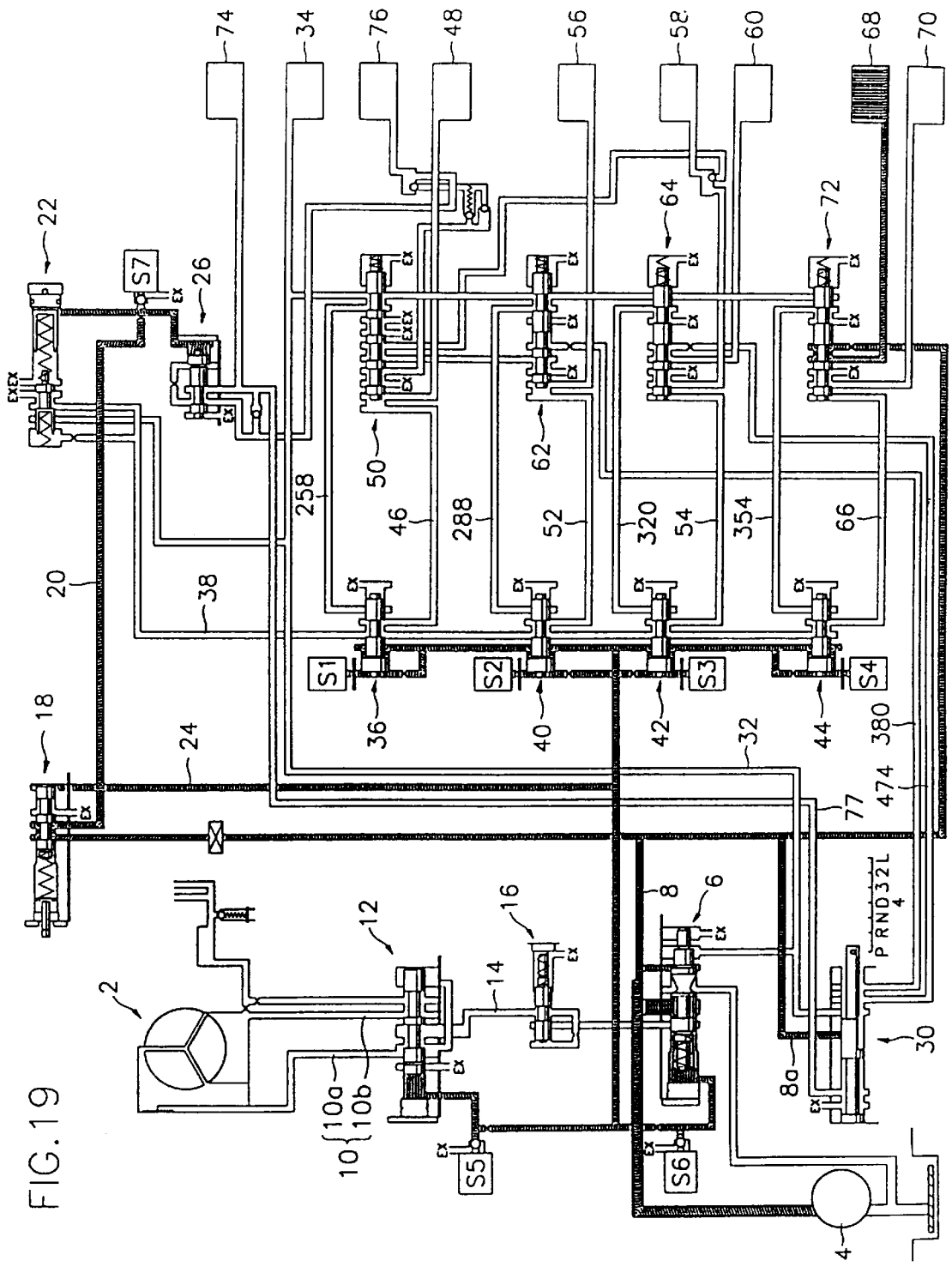
FIG. 19 is the hydraulic control system of FIG. 1 at a "P" (parking) range.

When the shift lever is positioned at a reverse mode, line pressure in the conduit 8a supplied to the manual valve 30 is transmitted to the reverse conduit 77, and the drive pressure transmitted toward the drive pressure conduit 32 is obstructed as shown in FIG. 18.

Under this state, the drive pressure supplied to the first shift control section D is obstructed, the reverse pressure flowing along the reverse conduit 77 is transmitted directly to the eighth friction element 74, a reverse friction element, to activate it.

At this moment, the TCU controls the seventh solenoid valve S7 to the OFF state, and the hydraulic pressure transmitted via the conduit 8, decreased by the solenoid supply valve 18, is supplied to the pressure chamber 434 of the reverse clutch inhibitor valve 26 and applied to a right face of the first land 436 of the spool 432.

Accordingly, the spool 432 of the reverse clutch inhibitor valve 26 is displaced leftward, and the first port 420 communicates with the second port 422 such that a portion of the pressurized fluid transmitted to the reverse conduit 77 can be supplied toward the conduit 416 through the second port 422.

Reverse pressure flowing through conduit 416 activates the ninth friction element 76 via the shuttle valve 418.

A portion of the pressurized fluid supplied to the conduit 8a is supplied via the second and third ports 516 and 520 of the over-drive unit valve 72 to activate the seventh friction element 70, and, accordingly, reverse driving can be performed as shown in FIG. 18.

When the shift lever is positioned at a parking mode, the line pressure in the conduit 8a supplied to the manual valve 30 is obstructed that it can not flow through the drive pressure conduit 32 or the reverse pressure conduit 77, and the line pressure is completely exhausted at the manual valve 30.

As described above, in the automatic transmission system for the automotive vehicle according to the present invention, an over-drive switch can be OFF-controlled or ON-controlled to constitute a four-speed transmission system or a five-speed transmission system, respectively. By switching the over-drive switch to the OFF state, line pressure from the manual valve 30 flows through the conduit 426 and a portion of the pressurized fluid flows along the drive pressure conduit 32 such that each of the friction elements are activated to perform speed shifting according to the operation of the TCU as shown in FIG. 20A.

That is, the first, fifth and sixth friction elements 34, 60 and 68 are activated at the first speed of the "3" range; the first, second, fifth and sixth friction elements 34, 48, 60 and 68 are activated at the second speed of the "3" range; and the first, second, third, fifth and sixth friction elements 34, 48, 56, 60 and 68 are activated at the second speed of the "3" range to perform the speed shifting automatically until reaching the third speed.

Also by selecting the "2" range of the shift lever, line pressure from the manual valve 30 flows through the conduit 474. As the drive pressure is supplied to the first and second shift control sections D and E, the first, fifth, sixth and ninth friction elements 34, 60, 68 and 76 are activated at the first speed; and the first, second, fourth, fifth and sixth friction elements 34, 48, 58, 60 and 68 are activated at the second speed to perform the speed shifting automatically until reaching the second speed.

Also, while the vehicle is driven at the first speed only when the shift lever is at the "L" range, at this moment, the friction elements are activated in the same manner as at the first speed of the "2" range.

According to the present invention, it is not only possible to perform automatic speed shifting controlled by the TCU, but also possible to perform a speed shifting operation equivalent to a manual speed shifting operation performed by a driver by selecting the shift lever from the "L" range to the "D" range.

When the TCU is not operating regularly, the transmission system maintains the present speed stage; when the engine is started again, it maintains the first speed stage.

On the other hand, when the driver makes an error by selecting a reverse range with the shift lever while driving in the "D" range, as an emergency safety means, the seventh solenoid valve S7 is controlled to the ON state by the TCU.

As the seventh solenoid valve S7 is controlled to the ON state, the hydraulic pressure in the pressure chamber 434 of the reverse clutch inhibitor valve 26 is exhausted. A portion of the pressurized fluid supplied from the reverse pressure conduit 77 through the first port 420 of the reverse clutch inhibiter valve 26 is supplied via the bypass conduit 424 to the fourth port 428 is applied on the left face of the second land 438 which displaces the spool 432 rightward.

As a result, the third land 440 obstructs the second port 422 and the supply of hydraulic pressure toward the conduit 416 is obstructed, such that the hydraulic pressure is not supplied to activate the ninth friction element 76, and, therefore, the vehicle is not driven rearward even though the shift lever is selected to the "R" range.

FIG. 20A illustrates which friction elements are activated at each shift stage in the hydraulic control system according to the invention.

FIG. 20B illustrates how the solenoid valves are operated at each shift stage in the hydraulic control system according to the invention. When shifting speed, the first, second, third and fourth solenoid valves S1, S2, S3 and S4 are controlled to ON/OFF states by the TCU. When shifting up, the seventh solenoid valve S7 is controlled to the ON state initially and then to the OFF state gradually. However, when shifting down, the seventh solenoid valve S7 is controlled to the OFF state initially and then to the ON state gradually, and, when the speed shifting is completed, the seventh solenoid valve S7 is controlled to the ON state.

As described above, in the automatic transmission system according to the invention, the power transmission efficiency can be improved and the shock caused during speed shifting can be reduced because the line pressure can be controlled to the levels required for each speed stage; the response is prompt because the speed shifting is performed by the torque pressure first and by the drive pressure second and also because the skip shifting is performed; an emergency safety means is provided to prevent the vehicle from being driven rearward when the reverse range is selected in error while driving forward; a manual speed shifting operation can be performed at drivers's choice; and, also, the shock caused during speed shifting can be further reduced because the transmission can perform five forward speeds.

What is claimed is:

1. An automatic transmission for an automotive vehicle, the transmission having multiple speed stages, comprising:

a hydraulic pump, driven by an engine, for pressurizing fluid;

a pressure regulating valve for varying hydraulic pressure supplied from the hydraulic pump when driving the vehicle forward or rearward;

a torque converter for transmitting power of the engine to an input shaft of the transmission;

a converter clutch regulator valve for activating a damper clutch to improve a transmission efficiency of the torque converter;

a supply valve for receiving line pressure from the pressure regulating valve and supplying reduced pressure to first, second, third, fourth, fifth, sixth and seventh solenoid valves;

a first friction element commonly activated at each of the speed stages;

second, third, fourth, fifth, sixth, seventh, eighth and ninth friction elements, at least one of which is activated according to the speed stages;

a torque control regulator valve for supplying torque pressure required to activate the friction elements;

a manual valve;

first-to-second, second-to-third, third-to-fourth and fourth-to-fifth speed shift valves for selectively supplying the torque pressure supplied from the torque control regulator valve or drive pressure regulated by the pressure regulating valve and supplied from the manual valve to the friction elements according to ON/OFF operations, respectively, of the first, second, third and fourth solenoid valves to shift speed; and second and third speed clutch valves, a fourth band valve and an over-drive unit valve controlled by the torque pressure for supplying activating pressure to the friction elements of the respective speed stages and supplying the activating pressure of next speed stages to the shift valves, wherein the manual valve supplies the line pressure regulated by the pressure regulating valve according to a position of a shift lever to the torque control regulator valve, the clutch valves and the band valve or to the first and sixth friction elements.

2. The automatic transmission for an automotive vehicle as claimed in claim 1, wherein the eighth friction element is a reverse friction element connected to the manual valve via a reverse pressure conduit directly to receive hydraulic pressure therefrom.

3. The automatic transmission for an automotive vehicle as claimed in claim 1, wherein a reverse clutch inhibiter valve for keeping the vehicle from driven rearward when a reverse range is selected at a drive range to obstruct supply of hydraulic pressure to the ninth friction element is disposed in a reverse pressure conduit through which hydraulic pressure is supplied to the eighth friction element to provide an emergency safety means.

4. The automatic transmission for an automotive vehicle as claimed in claim 1, wherein the torque control regulator valve comprises:

a pressure chamber for receiving hydraulic pressure controlled by the sixth solenoid valve;

a first spool for selectively obstructing the torque pressure supplied to the first-to-second shift valve;

a second spool for to which pressure in the pressure chamber is applied;

a first elastic member for biasing the first spool; and a second elastic member disposed between the first spool and the second spool to support the first and second spools elastically said second elastic member exerting an elastic force bigger than that of the first elastic member.

5. The automatic transmission for an automotive vehicle as claimed in claim, wherein the first-to-second shift valve comprises:

first and second ports for receiving control pressure from the second-to-third shift valve;

a third port for receiving the torque pressure from a torque pressure conduit;

a fourth port for receiving the drive pressure from the second clutch valve;

a fifth port for transmitting the torque pressure to the second-to-third shift valve;

a sixth port for transmitting the torque pressure or the drive pressure to the second clutch valve selectively; and a spool for opening or closing the ports according to a variation of pressure in a pressure chamber controlled by the first solenoid valve.

6. The automatic transmission for an automotive vehicle as claimed in claim 1, wherein the second-to-third shift valve comprises:

first and second ports connected to branch conduits of a control conduit;

a third port for receiving the torque pressure from the first-to-second shift valve;

a fourth port for receiving drive pressure from the third clutch valve;

a fifth port transmitting the torque pressure to the third-to-fourth shift valve;

a sixth port for transmitting pressure to the third clutch valve;

a seventh port for transmitting control pressure to the first-to-second shift valve; and a spool for opening or closing the ports according to a variation of pressure in a pressure chamber controlled by the second solenoid valve.

7. The automatic transmission for an automotive vehicle as claimed in claim 1, wherein the third-to-fourth shift valve comprises:

first and second ports connected to branch conduits of the control conduit;

a third port for receiving the torque pressure from the second-to-third shift valve;

a fourth port for receiving drive pressure from the fourth band valve;

a fifth port for transmitting the torque pressure to the fourth-to-fifth shift valve;

a sixth port for transmitting pressure to the fourth band valve;

a seventh port for transmitting control pressure to the fourth-to-fifth shift valve; and a spool for opening or closing the ports according to a variation of pressure in a pressure chamber controlled by the third solenoid valve.

8. The automatic transmission for an automotive vehicle as claimed in claim 1, wherein the fourth-to-fifth shift valve comprises:

first and second ports connected to branch conduits of the control conduit;

a third port for receiving the torque pressure from the third-to-fourth shift valve;

a fourth port for receiving drive pressure from the over-drive unit valve;

a fifth port for transmitting pressure to the over-drive unit valve; and a spool for opening or closing the ports according to a variation of pressure in a pressure chamber controlled by the fourth solenoid valve.

9. The automatic transmission for an automotive vehicle as claimed in claim 1, wherein the first solenoid valve controls hydraulic pressure in a pressure chamber of the first-to-second shift valve, the second solenoid valve controls hydraulic pressure in a pressure chamber of the second-to-third shift valve, the third solenoid valve controls hydraulic pressure in a pressure chamber of the third-to-fourth shift valve, and the fourth solenoid valve controls hydraulic pressure in a pressure chamber of the fourth-to-fifth shift valve to transmit the torque pressure and drive pressure sequentially.

10. The automatic transmission for an automotive vehicle as claimed in claim 1, wherein the manual valve has modes for "P", "R", "N", "D", "3", "2" and "L" ranges.

11. The automatic transmission for an automotive vehicle as claimed in claim 10, wherein the manual valve can be shifted to the "D", "3", "2" and "L" ranges manually.

12. The automatic transmission for an automotive vehicle as claimed in claim 11, wherein the drive pressure is supplied to the first and sixth friction elements directly at a first speed stage of the "D" range.

13. An automatic transmission for an automotive vehicle, the transmission having multiple speed stages, comprising:

a hydraulic pump, driven by an engine, for pressurizing fluid;

a pressure regulating valve for varying hydraulic pressure supplied from the hydraulic pump when driving the vehicle forward or rearward;

a torque converter for transmitting power of the engine to an input shaft of the transmission;

a converter clutch regulator valve for activating a damper clutch to improve a transmission efficiency of the torque converter;

a supply valve for receiving line pressure from the pressure regulating valve and supplying reduced pressure to first, second, third, fourth, fifth, sixth and seventh solenoid valves;

a first friction element commonly activated at each of the speed stages;

second, third, fourth, fifth, sixth, seventh, eighth and ninth friction elements, at least one of which is activated according to the speed stages;

a torque control regulator valve for supplying torque pressure required to activate the friction elements;

a manual valve;

first-to-second, second-to-third, third-to-fourth and fourth-to-fifth speed shift valves for selectively supplying the torque pressure supplied from the torque control regulator valve or drive pressure regulated by the pressure regulating valve and supplied from the manual valve to the friction elements according to ON/OFF operations, respectively, of the first, second, third and fourth solenoid valves to shift speed;

second and third speed clutch valves, a fourth band valve and an over-drive unit valve controlled by the torque pressure for supplying activating pressure to the friction elements of the respective speed stages and supplying the activating pressure of the next speed stages to the shift valves, wherein the manual valve supplies the line pressure regulated by the pressure regulating valve according to a position of a shift lever to the torque control regulator valve, the clutch valves and the band valve or to the first and sixth friction elements;

wherein the manual valve has modes for "P", "R", "N", "D", "3", "2" and "L" ranges;

wherein the manual valve can be shifted to the "D", "3", "2" and "L" ranges manually; and wherein the first solenoid valve for controlling the first-to-second shift valve is controlled to an OFF state to supply the drive pressure to friction elements which are activated at a first speed stage and to the second friction element at a second speed stage of the "D" range.

14. An automatic transmission for an automotive vehicle, the transmission having multiple speed stages, comprising:

a hydraulic pump, driven by an engine, for pressurizing fluid;

a pressure regulating valve for varying hydraulic pressure supplied from the hydraulic pump when driving the vehicle forward or rearward;

a torque converter for transmitting power of the engine to an input shaft of the transmission;

a converter clutch regulator valve for activating a damper clutch to improve a transmission efficiency of the torque converter;

a supply valve for receiving line pressure from the pressure regulating valve and supplying reduced pressure to first, second, third, fourth, fifth, sixth and seventh solenoid valves;

a first friction element commonly activated at each activated at each of the speed stages;

second, third fourth, fifth, sixth, seventh, eighth and ninth friction elements, at least one of which is activated according to the speed stages;

a torque control regulator valve for supplying torque pressure required to activate the friction elements;

a manual valve;

first-to-second, second-to-third, third-to-fourth and fourth-to-fifth speed shift valves for selectively supplying the torque pressure supplied from the torque control regulator valve or drive pressure regulated by the pressure regulating valve and supplied from the manual valve to the friction elements according to ON/OFF operations, respectively, of the first, second, third and fourth solenoid valves to shift speed;

second and third speed clutch valves, a fourth band valve and an over-drive unit valve controlled by the torque pressure for supplying activating pressure to the friction elements of the respective speed stages and supplying the activating pressure of the next speed stages to the shift valves, wherein the manual valve supplies the line pressure regulated by the pressure regulating valve according to a position of a shift lever to the torque control regulator valve, the clutch valves and the band valve or to the first and sixth friction elements;

wherein the manual valve has modes for "P", "R", "N", "D", "3", "2" and "L" ranges;

wherein the manual valve can be shifted to the "D", "3", "2" and "L" ranges manually. and wherein the second solenoid valve for controlling the second-to-third shift valve is controlled to an OFF state to supply the drive pressure to friction elements which are activated at a second speed stage and to the third friction element at a third speed stage of the "D" range.

15. An automatic transmission for an automotive vehicle, the transmission having multiple speed stages, comprising:

a hydraulic pump, driven by an engine, for pressurizing fluid;

a pressure regulating valve for varying hydraulic pressure supplied from the hydraulic pump when driving the vehicle forward or rearward;

a torque converter for transmitting power of the engine to an input shaft of the transmission;

a converter clutch regulator valve for activating a damper clutch to improve a transmission efficiency of the torque converter;

a supply valve for receiving line pressure from the pressure regulating valve and supplying reduced pressure to first, second, third, fourth, fifth, sixth and seventh solenoid valves;

a first friction element commonly activated at each of the speed stages;

second, third, fourth, fifth, sixth, seventh, eighth and ninth friction elements, at least one of which is activated according to the speed stages;

a torque control regulator valve for supplying torque pressure required to activate the friction elements;

a manual valve;

first-to-second, second-to-third, third-to-fourth and fourth-to-fifth speed shift valves for selectively supplying the torque pressure supplied from the torque control regulator valve or drive pressure regulated by the pressure regulating valve and supplied from the manual valve to the friction elements according to ON/OFF operations, respectively, of the first, second, third and fourth solenoid valves to shift speed;

second and third speed clutch valves, a fourth band valve and an over-drive unit valve controlled by the torque pressure for supplying activating pressure to the friction elements of the respective speed stages and supplying the activating pressure of the next speed stages to the shift valves, wherein the manual valve supplies the line pressure regulated by the pressure regulating valve according to a position of a shift lever to the torque control regulator valve, the clutch valves and the band valve or to the first and sixth friction elements;

wherein the manual valve has modes for "P", "R", "N", "D", "3", "2" and "L" ranges;

wherein the manual valve can be shifted to the "D", "3", "2" and "L" ranges manually; and wherein the third solenoid valve for controlling the third-to-fourth shift valve is controlled to an OFF state to supply the drive pressure to friction elements which are activated at a third speed stage and to the fourth friction element at a fourth speed stage of the "D" range.

16. An automatic transmission for an automotive vehicle, the transmission having multiple speed stages, comprising:

a hydraulic pump, driven by an engine, for pressurizing fluid;

a pressure regulating valve for varying hydraulic pressure supplied from the hydraulic pump when driving the vehicle forward or rearward;

a torque converter for transmitting power of the engine to an input shaft of the transmission;

a converter clutch regulator valve for activating a damper clutch to improve a transmission efficiency of the torque converter;

a supply valve for receiving line pressure from the pressure regulating valve and supplying reduced pressure to first, second third, fourth, fifth, sixth and seventh solenoid valves;

a first friction element commonly activated at each of the speed stages;

second, third, fourth, fifth, sixth, seventh, eighth and ninth friction elements, at least one of which is activated according to the speed stages;

a torque control regulator valve for supplying torque pressure required to activate the friction elements;

a manual valve;

first-to-second, second-to-third, third-to-fourth and fourth-to-fifth speed shift valves for selectively supplying the torque pressure supplied from the torque control regulator valve or drive pressure regulated by the pressure regulating valve and supplied from the manual valve to the friction elements according to ON/OFF operations, respectively, of the first, second, third and fourth solenoid valves to shift speed;

second and third speed clutch valves, a fourth band valve and an over-drive unit valve controlled by the torque pressure for supplying activating pressure to the friction elements of the respective speed stages and supplying the activating pressure of the next speed stages to the shift valves, wherein the manual valve supplies the line pressure regulated by the pressure regulating valve according to a position of a shift lever to the torque control regulator valve, the clutch valves and the band valve or to the first and sixth friction elements;

wherein the manual valve has modes for "P", "R", "N", "D", "3", "2" and "L" ranges;

wherein the manual valve can be shifted to the "D", "3", "2" and "L" ranges manually; and wherein the fourth solenoid valve for controlling the fourth-to-fifth shift valve is controlled to an OFF state to obstruct hydraulic pressure supplied to the sixth friction element and to supply the drive pressure to friction elements which are activated at a fourth speed stage and to the fifth friction element at a fifth speed stage of the "D" range.

17. An automatic transmission for an automotive vehicle, the transmission having multiple speed stages, comprising:

a hydraulic pump, driven by an engine, for pressurizing fluid;

a pressure regulating valve for varying hydraulic pressure supplied from the hydraulic pump when driving the vehicle forward or rearward;

a torque converter for transmitting power of the engine to an input shaft of the transmission;

a converter clutch regulator valve for activating a damper clutch to improve a transmission efficiency of the torque converter;

a supply valve for receiving line pressure from the pressure regulating valve and supplying reduced pressure to first, second, third, fourth, fifth, sixth and seventh solenoid valves;

a first friction element commonly activated at each of the speed stages;

second, third, fourth, fifth, sixth, seventh, eighth and ninth friction elements, at least one of which is activated according to the speed stages;

a torque control regulator valve for supplying torque pressure required to activate the friction elements;

a manual valve;

first-to-second, second-to-third, third-to-fourth and fourth-to-fifth speed shift valves for selectively supplying the torque pressure supplied from the torque control regulator valve or drive pressure regulated by the pressure regulating valve and supplied from the manual valve to the friction elements according to ON/OFF operations, respectively, of the first, second, third and fourth solenoid valves to shift speed;

second and third speed clutch valves, a fourth band valve and an over-drive unit valve controlled by the torque pressure for supplying activating pressure to the friction elements of the respective speed stages and supplying the activating pressure of the next speed stages to the shift valves, wherein the manual valve supplies the line pressure regulated by the pressure regulating valve according to a position of a shift lever to the torque control regulator valve, the clutch valves and the band valve or to the first and sixth friction elements;

wherein the manual valve has modes for "P", "R", "N", "D", "3", "2" and "L" ranges;

wherein the manual valve can be shifted to the "D", "3", "2" and "L" ranges manually; and wherein the first and second solenoid valves for controlling the first-to-second and second-to-third shift valves, respectively, are controlled to OFF states and the third and fourth solenoid valves for controlling the third-to-fourth and fourth-to-fifth shift valves, respectively, are controlled to ON states to enable a third-to-fourth skip shifting at the "D" range.

18. An automatic transmission for an automotive vehicle, the transmission having multiple speed stages, comprising:

a hydraulic pump, driven by an engine, for pressurizing fluid;

a pressure regulating valve for varying hydraulic pressure supplied from the hydraulic pump when driving the vehicle forward or rearward;

a torque converter for transmitting power of the engine to an input shaft of the transmission;

a converter clutch regulator valve for activating a damper clutch to improve a transmission efficiency of the torque converter;

a supply valve for receiving line pressure from the pressure regulating valve and supplying reduced pressure to first, second, third, fourth, fifth, sixth and seventh solenoid valves;

a first friction element commonly activated at each of the speed stages;

second, third, fourth, fifth, sixth, seventh, eighth and ninth friction elements, at least one of which is activated according to the speed stages;

a torque control regulator valve for supplying torque pressure required to activate the friction elements;

a manual valve;

first-to-second, second-to-third, third-to-fourth and fourth-to-fifth speed shift valves for selectively supplying the torque pressure supplied from the torque control regulator valve or drive pressure regulated by the pressure regulating valve and supplied from the manual valve to the friction elements according to ON/OFF operations, respectively, of the first, second, third and fourth solenoid valves to shift speed;

second and third speed clutch valves, a fourth band valve and an over-drive unit valve controlled by the torque pressure for supplying activating pressure to the friction elements of the respective speed stages and supplying the activating pressure of the next speed stages to the shift valves, wherein the manual valve supplies the line pressure regulated by the pressure regulating valve according to a position of a shift lever to the torque control regulator valve, the clutch valves and the band valve or to the first and sixth friction elements;

wherein the manual valve has modes for "P", "R", "N", "D", "3", "2" and "L" ranges;

wherein the manual valve can be shifted to the "D", "3", "2" and "L" ranges manually;

wherein the drive pressure is supplied to the first and sixth friction elements directly at a first speed stage of the "D" range; and wherein the first solenoid valve for controlling the first-to-second shift valve is controlled to an OFF state and the second, third and fourth solenoid valves for controlling the second-to-third, third-to-fourth and fourth-to-fifth shift valves, respectively, are controlled to ON states to enable a second-to-fifth skip shifting at the "D" range.

19. An automatic transmission for an automotive vehicle, the transmission having multiple speed stages, comprising:

a hydraulic pump, driven by an engine, for pressurizing fluid;

a pressure regulating valve for varying hydraulic pressure supplied from the hydraulic pump when driving the vehicle forward or rearward;

a torque converter for transmitting power of the engine to an input shaft of the transmission;

a converter clutch regulator valve for activating a damper clutch to improve a transmission efficiency of the torque converter;

a supply valve for receiving line pressure from the pressure regulating valve and supplying reduced pressure to first, second, third, fourth, fifth, sixth and seventh solenoid valves;

a first friction element commonly activated at each of the speed stages;

second, third, fourth, fifth, sixth, seventh, eighth and ninth friction elements, at least one of which is activated according to the speed stages;

a torque control regulator valve for supplying torque pressure required to activate the friction elements;

a manual valve;

first-to-second, second-to-third, third-to-fourth and fourth-to-fifth speed shift valves for selectively supplying the torque pressure supplied from the torque control regulator valve or drive pressure regulated by the pressure regulating valve and supplied from the manual valve to the friction elements according to ON/OFF operations, respectively, of the first, second, third and fourth solenoid valves to shift speed;

second and third speed clutch valves, a fourth band valve and an over-drive unit valve controlled by the torque pressure for supplying activating pressure to the friction elements of the respective speed stages and supplying the activating pressure of the next speed stages to the shift valves, wherein the manual valve supplies the line pressure regulated by the pressure regulating valve according to a position of a shift lever to the torque control regulator valve, the clutch valves and the band valve or to the first and sixth friction elements;

wherein the manual valve has modes for "P", "R", "N", "D""3", "2" and "L" ranges;

wherein the manual valve can be shifted to the "D", "3", "2" and "L" ranges manually; and wherein the first and fourth solenoid valves for controlling the first-to-second and fourth-to-fifth shift valves, respectively, are controlled to OFF states and the second and third solenoid valves for controlling the second-to-third and third-to-fourth shift valves, respectively, are controlled to ON states to enable a second-to-fourth skip shifting at the "D" range.

20. An automatic transmission for an automotive vehicle, the transmission having multiple speed stages, comprising:

a hydraulic pump, driven by an engine, for pressurizing fluid;

a pressure regulating valve for varying hydraulic pressure supplied from the hydraulic pump when driving the vehicle forward or rearward;

a torque converter for transmitting power of the engine to an input shaft of the transmission;

a converter clutch regulator valve for activating a damper clutch to improve a transmission efficiency of the torque converter;

a supply valve for receiving line pressure from the pressure regulating valve and supplying reduced pressure to first, second, third, fourth, fifth, sixth and seventh solenoid valves;

a first friction element commonly activated at each of the speed stages;

second, third, fourth, fifth, sixth, seventh, eighth and ninth friction elements, at least one of which is activated according to the speed stages;

a torque control regulator valve for supplying torque pressure required to activate the friction elements;

a manual valve;

first-to-second, second-to-third, third-to-fourth and fourth-to-fifth speed shift valves for selectively supplying the torque pressure supplied from the torque control regulator valve or drive pressure regulated by the pressure regulating valve and supplied from the manual valve to the friction elements according to ON/OFF operations, respectively, of the first, second, third and fourth solenoid valves to shift speed;

second and third speed clutch valves, a fourth band valve and an over-drive unit valve controlled by the torque pressure for supplying activating pressure to the friction elements of the respective speed stages and supplying the activating pressure of the next speed stages to the shift valves, wherein the manual valve supplies the line pressure regulated by the pressure regulating valve according to a position of a shift lever to the torque control regulator valve, the clutch valves and the band valve or to the first and sixth friction elements;

wherein the manual valve has modes for "P", "R", "N", "D", "3", "2" and "L" ranges;

wherein the manual valve can be shifted to the "D", "3", "2" and "L" ranges manually;

wherein the drive pressure is supplied to the first and sixth friction elements directly at a first speed stage of the "D" range; and wherein the first, second, third and fourth solenoid valves for controlling the first-to-second, second-to-third, third-to-fourth and fourth-to-fifth shift valves, respectively, are controlled to ON states to enable a first-to-fifth skip shifting at the "D" range.

21. An automatic transmission for an automotive vehicle, the transmission having multiple speed stages, comprising:

a hydraulic pump, driven by an engine, for pressurizing fluid;

a pressure regulating valve for varying hydraulic pressure supplied from the hydraulic pump when driving the vehicle forward or rearward;

a torque converter for transmitting power of the engine to an input shaft of the transmission;

a converter clutch regulator valve for activating a damper clutch to improve a transmission efficiency of the torque converter;

a supply valve for receiving line pressure from the pressure regulating valve and supplying reduced pressure to first, second, third, fourth, fifth, sixth and seventh solenoid valves;

a first friction element commonly activated at each of the speed stages;

second, third, fourth, fifth, sixth, seventh, eighth and ninth friction elements, at least one of which is activated according to the speed stages;

a torque control regulator valve for supplying torque pressure required to activate the friction elements;

a manual valve;

first-to-second, second-to-third, third-to-fourth and fourth-to-fifth speed shift valves for selectively supplying the torque pressure supplied from the torque control regulator valve or drive pressure regulated by the pressure regulating valve and supplied from the manual valve to the friction elements according to ON/OFF operations, respectively, of the first, second, third and fourth solenoid valves to shift speed;

second and third speed clutch valves, a fourth band valve and an over-drive unit valve controlled by the torque pressure for supplying activating pressure to the friction elements of the respective speed stages and supplying the activating pressure of the next speed stages to the shift valves, wherein the manual valve supplies the line pressure regulated by the pressure regulating valve according to a position of a shift lever to the torque control regulator valve, the clutch valves and the band valve or to the first and sixth friction elements;

wherein the manual valve has modes for "P", "R", "N", "D", "3", "2" and "L" ranges;

wherein the manual valve can be shifted to the "D", "3", "2" and "L" ranges manually; and wherein the first, second and third solenoid valves for controlling the first-to-second, second-to-third, and third-to-fourth shift valves, respectively, are controlled to ON states and the fourth solenoid valve for controlling the fourth-to-fifth shift valve is controlled to an OFF state to enable a first-to-fourth skip shifting at the "D" range.

22. An automatic transmission for an automotive vehicle, the transmission having multiple speed stages, comprising:

a hydraulic pump, driven by an engine for pressurizing fluid;

a pressure regulating valve for varying hydraulic pressure supplied from the hydraulic pump when driving the vehicle forward or rearward;

a torque converter for transmitting power of the engine to an input shaft of the transmission;

a converter clutch regulator valve for activating a damper clutch to improve a transmission efficiency of the torque converter;

a supply valve for receiving line pressure from the pressure regulating valve and supplying reduced pressure to first second, third, fourth, fifth, sixth and seventh solenoid valves;

a first friction element commonly activated at each of the speed stages;

second, third, fourth, fifth, sixth, seventh, eighth and ninth friction elements, at least one of which is activated according to the speed stages;

a torque control regulator valve for supplying torque pressure required to activate the friction elements;

a manual valve;

first-to-second, second-to-third, third-to-fourth and fourth-to-fifth speed shift valves for selectively supplying the torque pressure supplied from the torque control regulator valve or drive pressure regulated by the pressure regulating valve and supplied from the manual valve to the friction elements according to ON/OFF operations, respectively, of the first, second, third and fourth solenoid valves to shift speed;

second and third speed clutch valves, a fourth band valve and an over-drive unit valve controlled by the torque pressure for supplying activating pressure to the friction elements of the respective speed stages and supplying the activating pressure of the next speed stages to the shift valves, wherein the manual valve supplies the line pressure regulated by the pressure regulating valve according to a position of a shift lever to the torque control regulator valve, the clutch valves and the band valve or to the first and sixth friction elements;

wherein the manual valve has modes for "P", "R", "N", "D", "3", "2" and "L" ranges;

wherein the manual valve can be shifted to the "D", "3", "2" and "L" ranges manually;

wherein the drive pressure is supplied to the first and sixth friction elements directly at a first speed stage of the "D" range; and wherein the first and second solenoid valves for controlling the first-to-second and second-to-third shift valves, respectively, are controlled to ON states and the third and fourth solenoid valves for controlling the third-to-fourth and fourth-to-fifth shift valves, respectively, are controlled to OFF states to enable a first-to-third skip shifting at the "D" range.

23. The automatic transmission for an automotive vehicle as claimed in claim 1, wherein the supply valve has a spool, an elastic member for biasing the spool to regulate hydraulic pressure supplied from the supply valve, and a screw for compressing or releasing the elastic member.

* * * * *